(12) United States Patent
Khoshnevisan et al.

(10) Patent No.: US 11,576,062 B2
(45) Date of Patent: Feb. 7, 2023

(54) OVERBOOKING FOR MULTI-DCI BASED MULTI-TRANSMIT-RECEIVE POINTS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Huilin Xu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 103 days.

(21) Appl. No.: 17/081,630

(22) Filed: Oct. 27, 2020

(65) Prior Publication Data
US 2021/0127285 A1    Apr. 29, 2021

Related U.S. Application Data

(60) Provisional application No. 62/927,506, filed on Oct. 29, 2019.

(51) Int. Cl.
| | |
|---|---|
| H04L 5/00 | (2006.01) |
| H04W 24/08 | (2009.01) |
| H04W 72/12 | (2009.01) |
| H04L 1/00 | (2006.01) |
| H04W 8/24 | (2009.01) |
| H04W 72/04 | (2009.01) |

(52) U.S. Cl.
CPC .......... *H04W 24/08* (2013.01); *H04L 1/0038* (2013.01); *H04L 5/0094* (2013.01); *H04W 8/24* (2013.01); *H04W 72/042* (2013.01); *H04W 72/0446* (2013.01); *H04W 72/0493* (2013.01); *H04W 72/1289* (2013.01)

(58) Field of Classification Search
None
See application file for complete search history.

(56) References Cited

U.S. PATENT DOCUMENTS

2021/0314997 A1\* 10/2021 Seo ........................ H04L 5/0094

OTHER PUBLICATIONS

3GPP TSG RAN WG1 #98bis, R1-1911184, Oct. 14-20, 2019.\*
(Continued)

*Primary Examiner* — Abdelillah Elmejjarmi
(74) *Attorney, Agent, or Firm* — Arent Fox, LLP

(57) ABSTRACT

Since multiple transmit-receive point (TRP) communications may increase the number of physical downlink control channel (PDCCH) candidates or non-overlapped control channel elements (CCEs) without increasing the number of cells, new limits for multi-TRP communications including overbooking may be defined. A UE may determine whether a per scheduled cell limit is greater than a per TRP limit for a primary cell. The UE may identify, based on the determining, a set of search spaces of a PDCCH on which overbooking is permitted. The UE may receive the PDCCH from the primary cell within the slot. The UE may perform blind decoding operations on CCEs within the identified set of search spaces of the PDCCH within at least a total monitoring limit for a group of component carriers having a same sub-carrier spacing (SCS) as the primary cell and the per cell monitoring limit for the primary cell.

24 Claims, 11 Drawing Sheets

(56) References Cited

OTHER PUBLICATIONS

International Search Report and Written Opinion—PCT/US2020/057753—ISA/EPO—dated Mar. 11, 2021.

NTT Docomo Inc: "Enhancements on Multi-TRP/Panel Transmission", 3GPP Draft, 3GPP TSG RAN WG1 #98bis, R1-1911184, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808317,32 Pages, Retrieved from the Internet: URL: https://ftp.3gpp.org/tsg_ran/WG1_RL1/TSGR1_98b/Docs/R1-1911184.zip R1-191184.docx [retrieved Oct. 4, 2019].

Qualcomm Incorporated: "Multi-TRP Enhancements", 3GPP Draft, 3GPP TSC-RA WC1 Meeting #98bis, R1-1911126, Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051789902, 26 Pages, Retrieved from the Internet: URL: https://ftp.3gpp.org/tsg_ran/WG1_RL1/TSGR1_98b/Docs/R1-1911126.zip R1-1911126 Multi-TRP Enhancements.docx[retrieved on Oct. 5, 2019.

Qualcomm Incorporated: "Multi-TRP Enhancements", 3GPP TSG-RAN WG1 Meeting #98, 3GPP Draft; R1-1909272 Multi-TRP Enhancements, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 26, 2019-Aug. 30, 2019, Aug. 17, 2019 (Aug. 17, 2019), 32 Pages, XP051765877, Retrieved from the Internet URL: http://www.3gpp.org/ftp/tsg_ran/WG1_RL1/TSGR1_98/Docs/R1-1909272.zip [retrieved on Aug. 17, 2019].

* cited by examiner

OVERBOOKING FOR MULTI-DCI BASED MULTI-TRANSMIT-RECEIVE POINTS

This application claims priority to U.S. Provisional Application No. 62/927,206 titled "OVERBOOKING FOR MULTI-DCI BASED MULTI-TRANSMIT-RECEIVE POINTS," filed Oct. 29, 2019, which is assigned to the assignee hereof, and incorporated herein by reference in its entirety.

BACKGROUND

Technical Field

The present disclosure relates generally to communication systems, and more particularly, to limitations on control channel processing.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, methods, a non-transitory computer-readable mediums, and apparatuses are provided. The method may include determining, by a UE, whether a per scheduled cell limit for physical downlink control channel (PDCCH) monitoring or for non-overlapped control channel elements (CCEs) to monitor in a slot is equal to a per transmit receive point (TRP) limit for PDCCH monitoring or for non-overlapped CCEs to monitor in the slot for a primary cell. The method may include identifying, based on the determining, a set of search spaces on which overbooking is permitted. The method may include receiving a downlink control channel from the primary cell within the slot. The method may include performing blind decoding operations on CCEs within the identified set of search spaces of the downlink control channel within at least a total monitoring limit for a group of component carriers having a same sub-carrier spacing (SCS) as the primary cell and the per cell monitoring limit for the primary cell.

In an aspect, the disclosure provides an apparatus for wireless communication. The apparatus may include a memory storing computer-executable instructions and a processor, communicatively coupled with the memory and configured to execute the instructions. The processor may be configured to determine, by a UE, whether a per scheduled cell limit for PDCCH monitoring or for non-overlapped CCEs to monitor in a slot is equal to a per TRP limit for PDCCH monitoring or for non-overlapped CCEs to monitor in the slot for a primary cell. The processor may be configured to identify, based on the determining, a set of search spaces on which overbooking is permitted. The processor may be configured to receive a downlink control channel from the primary cell within the slot. The processor may be configured to perform blind decoding operations on CCEs within the identified set of search spaces of the downlink control channel within at least a total monitoring limit for a group of component carriers having a same SCS as the primary cell and the per cell monitoring limit for the primary cell.

In another aspect, the disclosure provides an apparatus for wireless communication. The apparatus may include means for determining, by a UE, whether a per scheduled cell limit for PDCCH monitoring or for non-overlapped CCEs to monitor in a slot is equal to a per TRP limit for PDCCH monitoring or for non-overlapped CCEs to monitor in the slot for a primary cell. The apparatus may include means for identifying, based on the determining, a set of search spaces on which overbooking is permitted. The apparatus may include means for receiving a downlink control channel from the primary cell within the slot. The apparatus may include means for performing blind decoding operations on CCEs within the identified set of search spaces of the downlink control channel within at least a total monitoring limit for a group of component carriers having a same SCS as the primary cell and the per cell monitoring limit for the primary cell.

In another aspect, the disclosure provides a non-transitory computer-readable medium storing computer executable code. The non-transitory computer-readable medium may include code to determine, by a UE, whether a per scheduled cell limit for PDCCH monitoring or for non-overlapped CCEs to monitor in a slot is equal to a per TRP limit for PDCCH monitoring or for non-overlapped CCEs to monitor in the slot for a primary cell. The non-transitory computer-readable medium may include code to identify, based on the determining, a set of search spaces on which overbooking is permitted. The non-transitory computer-readable medium may include code to receive a downlink control channel from the primary cell within the slot. The non-transitory computer-readable medium may include code to perform blind decoding operations on CCEs within the identified set of search spaces of the downlink control channel within at least a total monitoring limit for a group of component carriers having a same SCS as the primary cell and the per cell monitoring limit for the primary cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
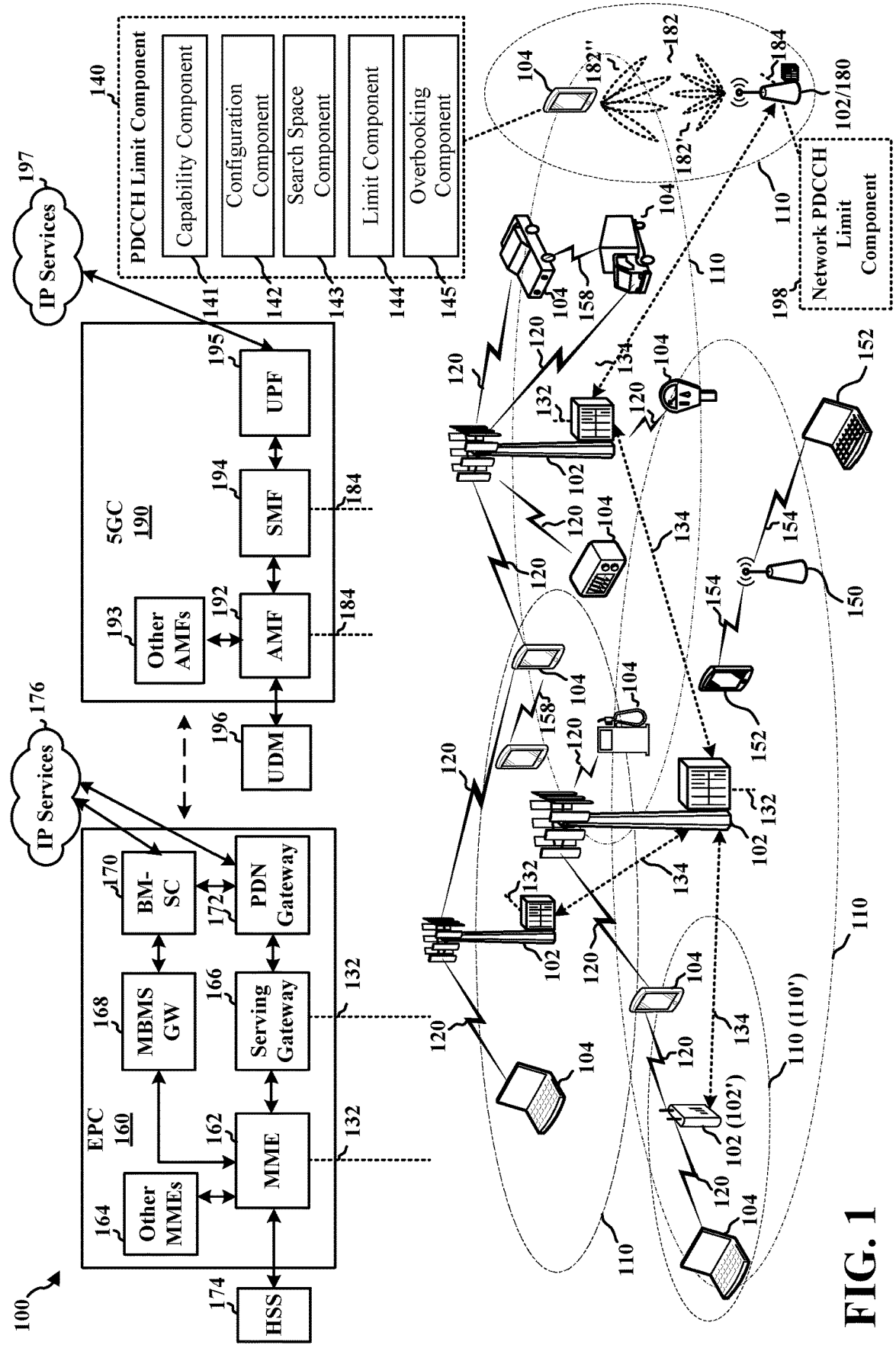
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

An access network may utilize multiple transmit-receive points (TRPs) for a single cell. In some deployments, a separate downlink control information (DCI) may be used to schedule a downlink transmission from each TRP. For example, in the case of two TRPs, a first DCI transmitted from a first TRP may schedule a first physical downlink shared channel (PDSCH) transmitted from the first TRP, and a second DCI transmitted from the second TRP may schedule a second PDSCH transmitted from the second TRP. The use of multiple TRPs may be defined for a specific serving cell such that one or more cells may be configured with multiple TRPs while other serving cells may be configured with a single TRP. The multiple TRPs may operate in the same active bandwidth part (BWP) with the same subcarrier spacing (SCS). In order to determine the PDSCH transmissions, a UE may monitor a set of PDCCH candidates in one or more control resource sets (CORESETs). Each CORESET may include multiple control channel elements (CCE) defining a search space set. A non-overlapped CCE may refer to a unique CCE that does not use the same time and frequency domain resources as another CCE. The search space may include a common search space (CSS) and a UE-specific search space (USS). The monitoring of the set of PDCCH candidates in one or more CORESETs may be referred to as blind decoding as the UE may not know which DCI format is being received and may decode each PDCCH candidate according to the monitored DCI formats.

The utilization of multiple TRPs and multiple DCIs may increase the resources needed for PDCCH decoding. In an aspect, a maximum number of CORESETs may be increased (e.g., to 5 CORESETS) over Release 15 of 5G-NR to accommodate additional DCIs. Additionally, higher layer signaling may indicate an index per CORESET, which may group the CORESETS based on TRP. Generally, however, the use of multiple TRPs may be transparent to a UE.

PDCCH reception may be subject to limits based on UE capability. As a wireless device employs a blind detection algorithm for downlink control channel decoding, prior information of the maximum number of downlink control channels transmitted from multi-TRPs to detect is useful to reduce the downlink control channel searching time. When configured with multiple TRPs, each scheduling a data packet, the UE can stop the blind decoding when the UE reaches a defined limit on a number of PDCCH candidates or non-overlapped CCEs. Otherwise (e.g., if there is no defined limit for the UE), the UE may perform blind decoding for all possibilities of downlink control channel candidates across the search space(s). Conventionally, UE decoding capabilities have been based on a number of cells.

Since multi-TRP communications may increase the number of PDCCH candidates without increasing the number of cells, new limits for multi-TRP communications may be defined. For example, a PDCCH monitoring capability across all downlink serving cells may account for multiple TRP cells and for carrier aggregation and dual connectivity using a multiplication factor. Further, a limit determined by the network and the UE based on the capability and a configuration may account for multiple TRP cells and for carrier aggregation and dual connectivity using a multiplication factor. Additionally, there may be a per TRP limit on the number of PDCCH candidates or non-overlapped CCEs. Finally, overbooking procedures for primary cells without configured limits may define UE decoding operations. When a per scheduled cell limit for PDCCH monitoring or for non-overlapped CCEs to monitor in a slot is equal to a per TRP limit for PDCCH monitoring or for non-overlapped CCEs to monitor in the slot for a primary cell, overbooking may be applicable to all configured search spaces and the per cell limits may be applicable to overbooking procedures. In contrast, when the per scheduled cell limit for PDCCH monitoring or for non-overlapped CCEs to monitor in a slot is not equal to (e.g., greater than) the per TRP limit for PDCCH monitoring or for non-overlapped CCEs to monitor in the slot for a primary cell, overbooking may be applicable to search spaces for a configured TRP identified by a corresponding configured value of a higher layer index per CORESET and the per TRP limits may be applicable to overbooking procedures.

In an aspect, in an implementation, a UE may determine whether to signal a number representing a PDCCH monitoring capability across all downlink serving cells based on a multiplication factor capability (R) for serving cells with multiple transmit-receive points (TRPs) compared to serving cells with a single TRP. The UE may receive a configuration of serving cells indicating a number of configured downlink serving cells with single TRP and a number of configured downlink serving cells with multiple TRPs. The UE may determine a limit of a number of serving cells (Ncap) based on the configuration and the multiplication factor when the number is not signaled or based on the number when signaled. The configuration may also include a configured multiplication factor (r). The UE may determine a total monitoring limit of PDCCH candidates and non-overlapped CCEs to monitor in a slot for a cell group and a per cell monitoring limit of PDCCH candidates and non-overlapped CCEs to monitor in a slot per scheduled cell for single TRP cells and for multiple TRP cells based on the Ncap. The UE may receive a downlink control channel within a slot and performing blind decoding operations on CCEs up to the total monitoring limit and up to the per cell monitoring limit. In some cases, the blind decoding operations may be subject to the per TRP limit.

Several aspects of telecommunication systems will now be presented with reference to various apparatuses and methods. These apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 in which limits for blind decoding of a search space are implemented. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

In an aspect, one or more of the UEs 104 may include a PDCCH limit component 140 for determining and applying one or both of a limit on a number of PDCCH candidates and a limit on a number of non-overlapped CCEs to be used for blind decoding of a search space. The PDCCH limit component 140 may apply the limits in the case of overbooking where the UE 104 may be configured with search spaces that exceed the limits. The PDCCH limit component 140 may include a capability component 141 that signals zero or more UE capabilities related to PDCCH reception, a configuration component 142 that receives a cell configuration for the access network 100 including one or more serving cells (e.g., base stations 102), a limit component 144 that determines a limit on a number of serving cells (Ncap) and the limit on the number of PDCCH candidates and/or the limit on the number of non-overlapped CCEs based on the Ncap, a search space component 143 that determines an applicable search space for overbooking, and an overbooking component 145 that performs blind decoding operations for PDCCH candidates on the CCEs up to the limits.

In an implementation, the PDCCH limit component 140 may define limits based on a number of serving cells, but may increase a weight for multiple TRP cells using a multiplication factor capability (R) or a configured multiplication factor (r). The value of R and r may be between 1 and 2 inclusive for configurations with up to two TRPs in a given serving cell corresponding to two CORESET groups. For more than two TRPs/CORESET groups the conditions may be different (e.g., the value of R or r may be greater than 2). The capability component 141 may determine whether to signal a number (X) representing PDCCH monitoring capability across all downlink serving cells based on the multiplication factor capability (R) for serving cells with multiple transmit-receive points (TRPs) compared to serving cells with a single TRP. The configuration component 142 may receive a configuration of serving cells indicating a number (a) of configured downlink serving cells with single TRP, a number (b) of configured downlink serving cells with multiple TRPs, and the configured multiplication factor (r). The limit component 144 may determine a limit of a number of serving cells (Ncap) based on the configuration and the multiplication factor r when the number is not signaled or based on the number when signaled. The limit component 144 may determine a total monitoring limit of PDCCH candidates and non-overlapped control channel elements (CCEs) to monitor in a slot for a cell group, a per cell monitoring limit of PDCCH candidates and non-overlapped CCEs to monitor in a slot per scheduled cell for single TRP cells and for multiple TRP cells based on the Ncap, and a per TRP limit of PDCCH candidates and non-overlapped CCEs to monitor in a slot. The search space component 143 may determine to which UE specific search spaces overbooking is applicable based on the determined per cell limits and per TRP limits. The overbooking component 145 may receive a downlink control channel within a slot and perform blind decoding operations on CCEs within at least the total monitoring limit and up to the per cell monitoring limit. The overbooking component 145 may also perform the decoding operations within the per TRP limit.

In an aspect, one or more of base station 102 may include a network PDCCH limit component 198 that may operate in conjunction with the PDCCH limit component 140 to determine the limits discussed above. In particular, the network PDCCH limit component 198 may receive any capabilities signaled by the UE 104 and may transmit the configuration of serving cells including the number (a) of configured downlink serving cells with single TRP, the number (b) of configured downlink serving cells with multiple TRPs, and the configured multiplication factor (r). The network PDCCH limit component 198 may determine Ncap, the total limits, the per cell limits, and the per TRP limits in the same manner as discussed above for the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF)

band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
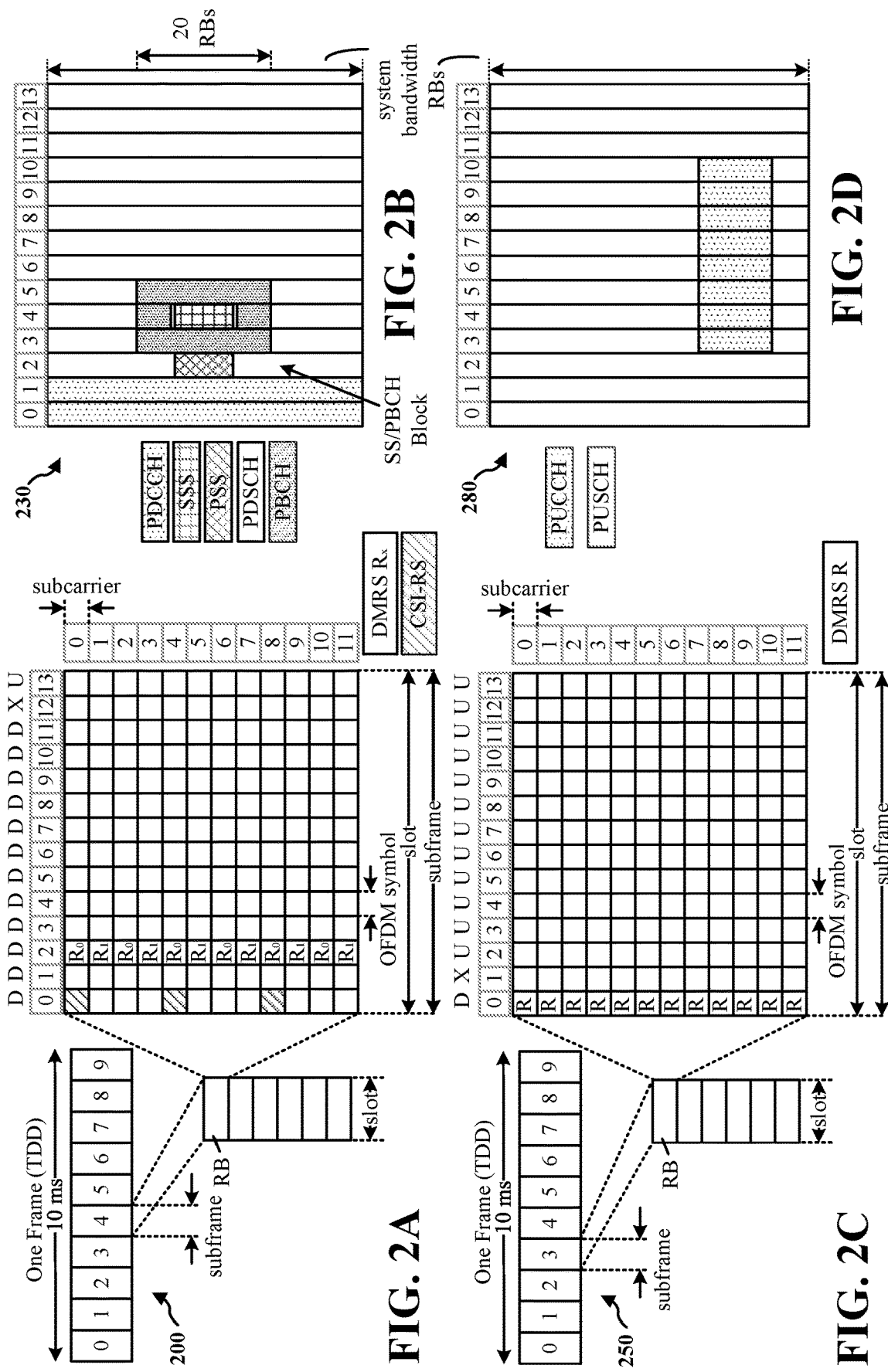
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a UL channels within a subframe.

FIGS. 2A-2D are resource diagrams illustrating example frame structures and resources that may be used by communications between the UE 104 and the base station 102 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
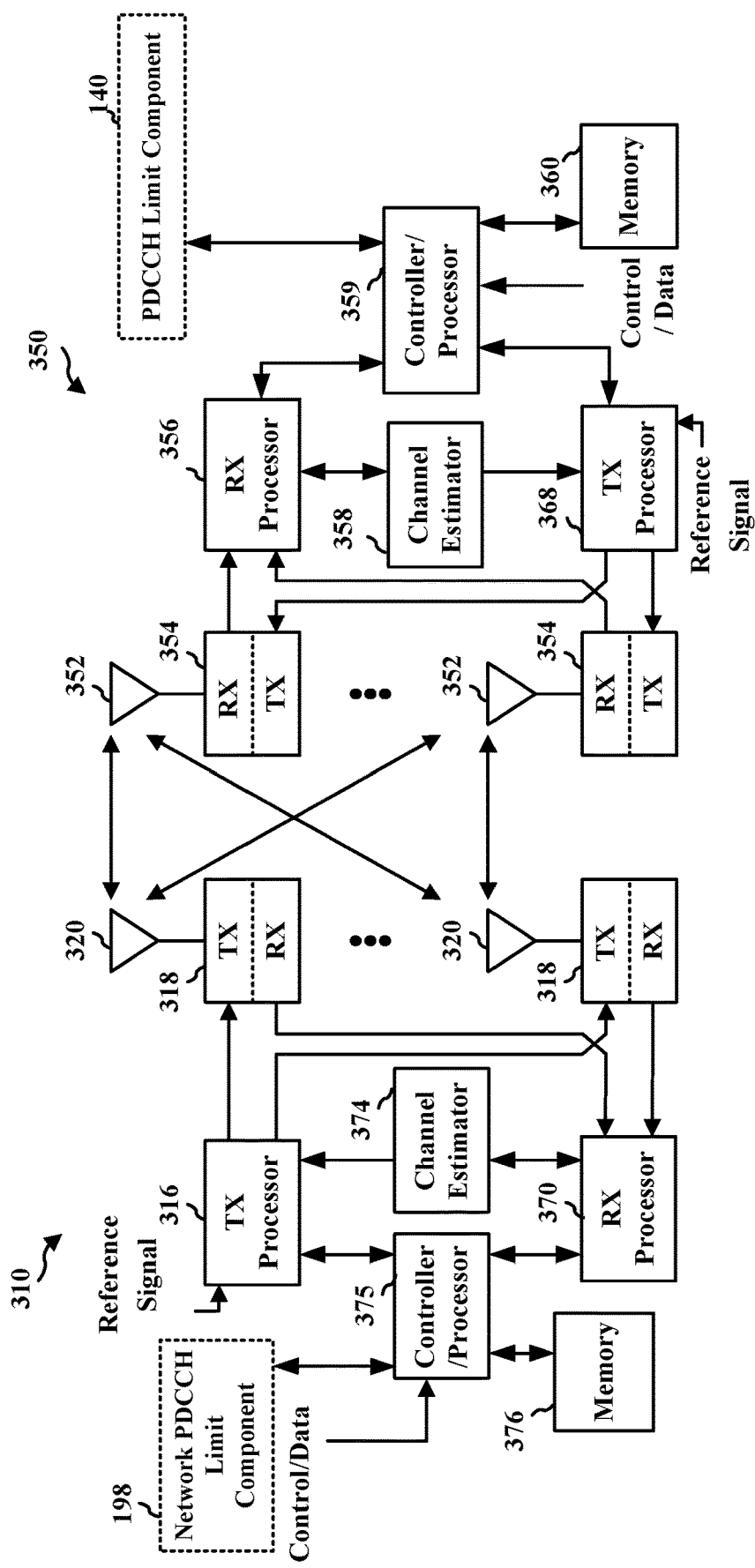
FIG. 3 is a diagram illustrating an example of a base station and user equipment (UE) in an access network.

FIG. 3 is a block diagram of a base station 310 including a network PDCCH limit component 198 in communication with a UE 350 including a PDCCH limit component 140 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDCCH limit component 140 of FIG. 1.

Figure 4:
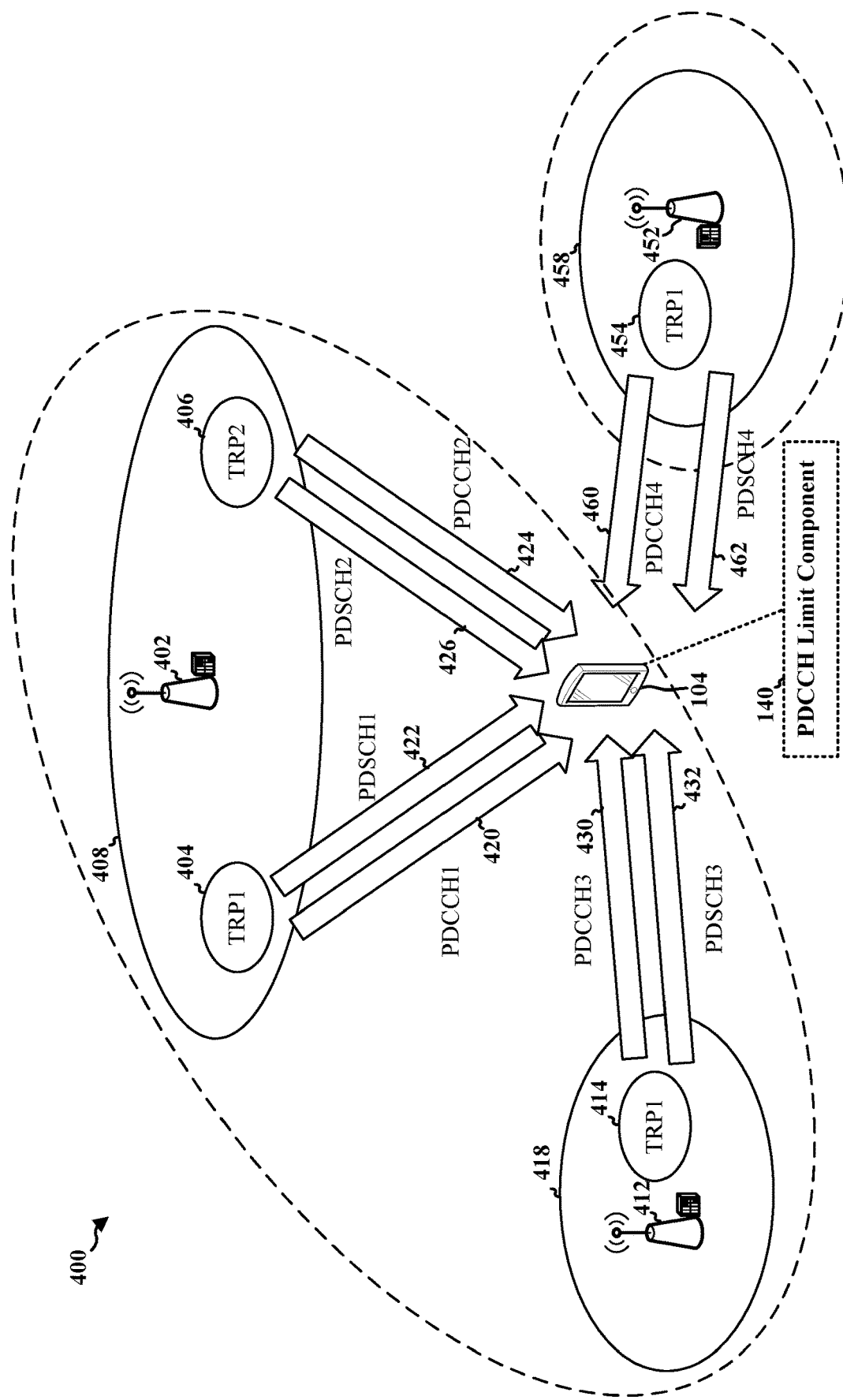
FIG. 4 is a schematic diagram illustrating an example configuration of serving cells for a UE.

FIG. 4 is an example cell configuration 400 including a multiple TRP cell 408 and a single TRP cell 418 for a UE 104 including a PDCCH limit component 140. The multiple TRP cell 408 may be controlled by a base station 402 and may include a first TRP 404 and a second TRP 406. The first TRP 404 may transmit a first PDCCH1 420 that schedules a first PDSCH1 422. The second TRP 406 may transmit a second PDCCH1 424 that schedules a second PDSCH 426. The single TRP cell 418 may be controlled by a base station 412 and include a single TRP 414. The single TRP 414 may transmit a third PDCCH3 430 scheduling a third PDSCH 432. In an aspect, the multiple TRP cell 408 and a single TRP cell 418 may form a master cell group (MCG). Additionally, the cell configuration 400 may include a secondary cell group (SCG), which may include, for example, a single TRP cell 458. The single TRP cell 458 may be controlled by a base station 452 and include a single TRP 454. The single TRP 454 may transmit a third PDCCH4 460 scheduling a third PDSCH 462. The cell configuration 400 may include additional cells (not shown) that may each be a single TRP cell or a multiple TRP cell and may transmit a respective PDCCH from each TRP.

In an aspect, all of the PDCCH 420, 424, 430, and 460 may be received in the same slot depending on UE capabilities and limits. In an aspect, multiple PDCCH transmissions may allow scheduling of greater amounts of data, thereby increasing the data rate for the UE 104. The UE 104, however, may be constrained (e.g., by hardware limits) on the amount of PDCCH processing that may be performed. If the UE 104 were to determine capabilities or limits based on only a number of serving cells, the UE 104 may not accurately account for additional PDCCHs that may be transmitted by multiple TRP cells using multiple DCIs, and the UE 104 would be unable to decode all of the configured PDCCHs in some cases. The PDCCH limit component 140 may signal capabilities and determine limits taking into account multiple TRP cells such that the UE 104 may decode the PDCCHs for which it is configured.

Figure 5:
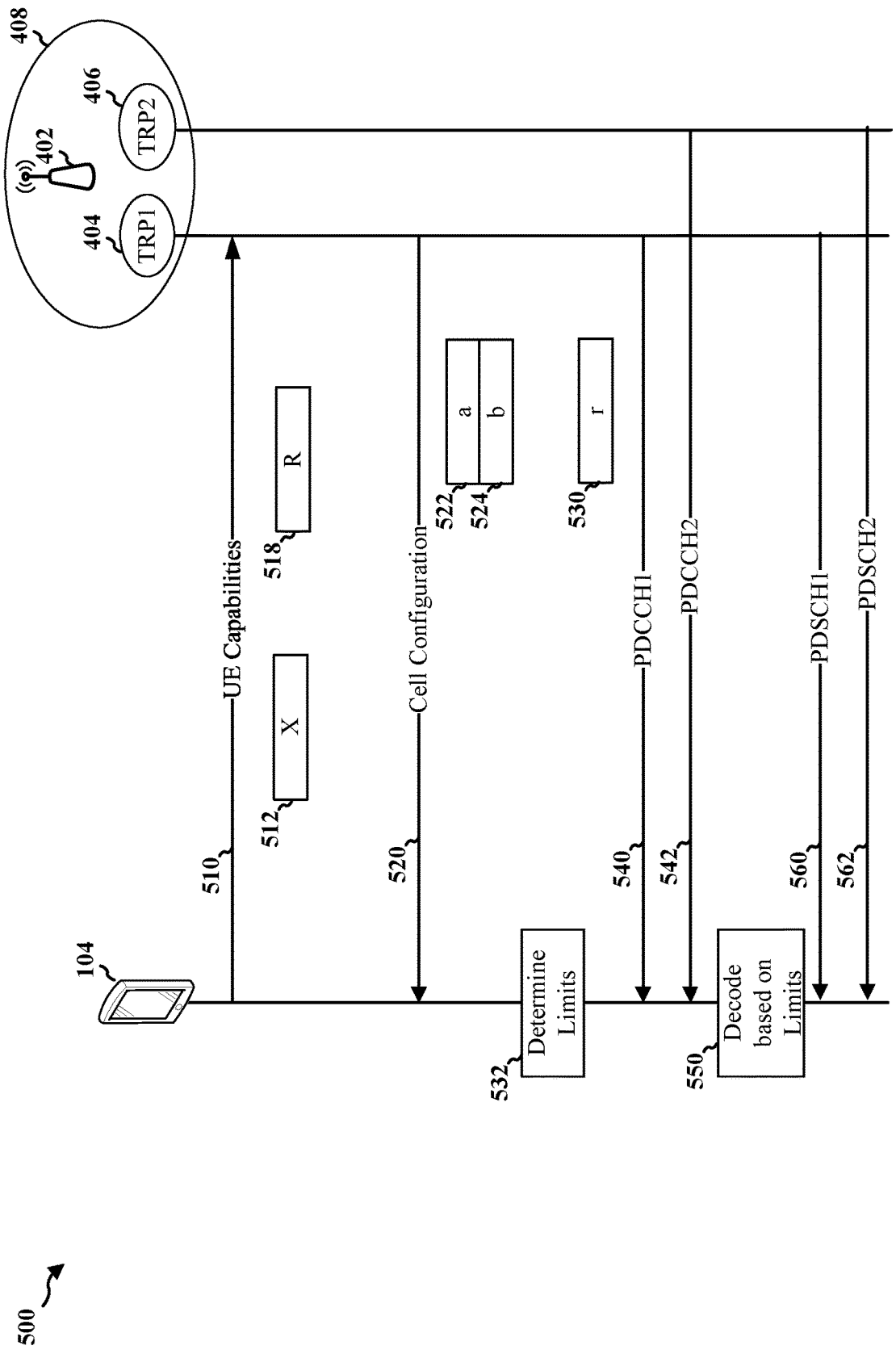
FIG. 5 is a message diagram including example communications and processing by a UE and base station for determining PDCCH reception limits.

FIG. 5 is a message diagram 500 illustrating example messages that may be transmitted between a UE 104 and a base station 402, which may be a multiple TRP cell 408 including a first TRP 404 and a second TRP 406, for establishing limits for blind decoding of PDCCH.

The UE 104 may transmit UE capabilities 510 that are related to PDCCH processing. For example, the UE capabilities 510 may include a number (X) 512 representing PDCCH monitoring capability across all downlink serving cells. The number X may be referred to as pdcch-BlindDetectionCA. The UE 104 may determine whether to transmit X 512 based on whether the UE 104 is capable of supporting a threshold number (e.g., 4) of downlink serving cells. The UE capabilities 510 may include a multiplication factor capability (R) 518 indicating a capability to perform additional PDCCH monitoring or additional non-overlapped CCEs to monitor for multiple TRP cells.

The base station 402 may transmit a cell configuration 520 that may configure the UE 104 with a plurality of serving cells. For example, the cell configuration 520 may include or may indicate a number of single TRP cells (a) 522 and a number of multiple TRP cells (b) 524. The cell configuration 520 may include a configured multiplication factor (r) 530 indicating a network selected multiplication factor. The cell configuration 520 may set the value of r 530 to 1 or the value of R 518. If the cell configuration 520 does not include the configured multiplication factor r 530, the UE 104 may set the value of r 530 to the value of R 518.

At block 532, the UE 104 may determine limits on PDCCH reception. For example, the UE 104 may determine a total monitoring limit of PDCCH candidates and non-overlapped CCEs to monitor in a slot for a cell group. A maximum number of monitored PDCCH candidates for an SCS may be referred to as $M_{PDCCH}^{max,slot,\mu}$. $M_{PDCCH}^{max,slot,\mu}$ may be determined based on the following table:

TABLE 10.1-2

Maximum number $M_{PDCCH}^{max,\ slot,\ \mu}$ of monitored
PDCCH candidates per slot for a DL BWP with SCS configuration
$\mu \in \{0, 1, 2, 3\}$ for a single serving cell

| $\mu$ | Maximum number of monitored PDCCH candidates per slot and per serving cell $M_{PDCCH}^{max,\ slot,\ \mu}$ |
|---|---|
| 0 | 44 |
| 1 | 36 |
| 2 | 22 |
| 3 | 20 |

A maximum number of the number of non-overlapped CCEs may be referred to as $C_{PDCCH}^{max,slot,\mu}$. $C_{PDCCH}^{max,slot,\mu}$ may be determined based on the following table:

TABLE 10.1-3

Maximum number $C_{PDCCH}^{max,\ slot,\ \mu}$ of non-overlapped
CCEs per slot for a DL BWP with SCS configuration
$\mu \in \{0, 1, 2, 3\}$ for a single serving cell

| $\mu$ | Maximum number of non-overlapped CCEs per slot and per serving cell $C_{PDCCH}^{max,\ slot,\ \mu}$ |
|---|---|
| 0 | 56 |
| 1 | 56 |

TABLE 10.1-3-continued

Maximum number $C_{PDCCH}^{max,\ slot,\ \mu}$ of non-overlapped
CCEs per slot for a DL BWP with SCS configuration
$\mu \in \{0, 1, 2, 3\}$ for a single serving cell

| $\mu$ | Maximum number of non-overlapped CCEs per slot and per serving cell $C_{PDCCH}^{max,\ slot,\ \mu}$ |
|---|---|
| 2 | 48 |
| 3 | 32 |

As discussed in further detail below, in the present application, the limits may account for multiple TRP cells as opposed to a single serving cell with a single TRP. In an implementation, a total monitoring limit may apply to all serving cells in a cell group. The UE 104 may also determine a per cell monitoring limit. In an implementation, the per cell monitoring limit for multiple TRP cells may be based on the multiplication factor.

The base station 102 may transmit a first PDCCH 540 and a second PDCCH 542, and the UE 104 may receive the first PDCCH 540 and the second PDCCH 542 as well as other PDCCH transmitted by other serving cells based on the limits determined in block 532. In an aspect, the network may be aware of the limits based the UE capabilities 510 and the cell configuration 520 and may avoid transmitting PDCCH that would exceed the limits of the UE. In an aspect, however, a primary serving cell may use overbooking to configure the UE 104 with PDCCH candidates that may result in exceeding the limits on PDCCH candidates and/or non-overlapped CCEs.

At block 550, the UE 104 may perform decoding based on the limits. That is, the UE 104 may decode PDCCH candidates up to the limit of PDCCH candidates (e.g., $M_{PDCCH}^{max,slot,\mu}$) on up to the limit of non-overlapped CCEs (e.g., $C_{PDCCH}^{max,slot,\mu}$). In the case of overbooking, even if the UE 104 is configured with PDCCH candidates that exceed the limit (e.g., based on the number of candidates and corresponding aggregation levels of the configured search spaces), the UE 104 may abide by the limits and stop decoding when one or more of the limits is reached.

The base station 402 may transmit a first PDSCH 560 and a second PDSCH 562 from the first TRP 404 and the second TRP 406, respectively. The UE 104 may receive the first PDSCH 560 and the second PDSCH 562 based on the decoded PDCCHs 540, 542.

Figure 6:
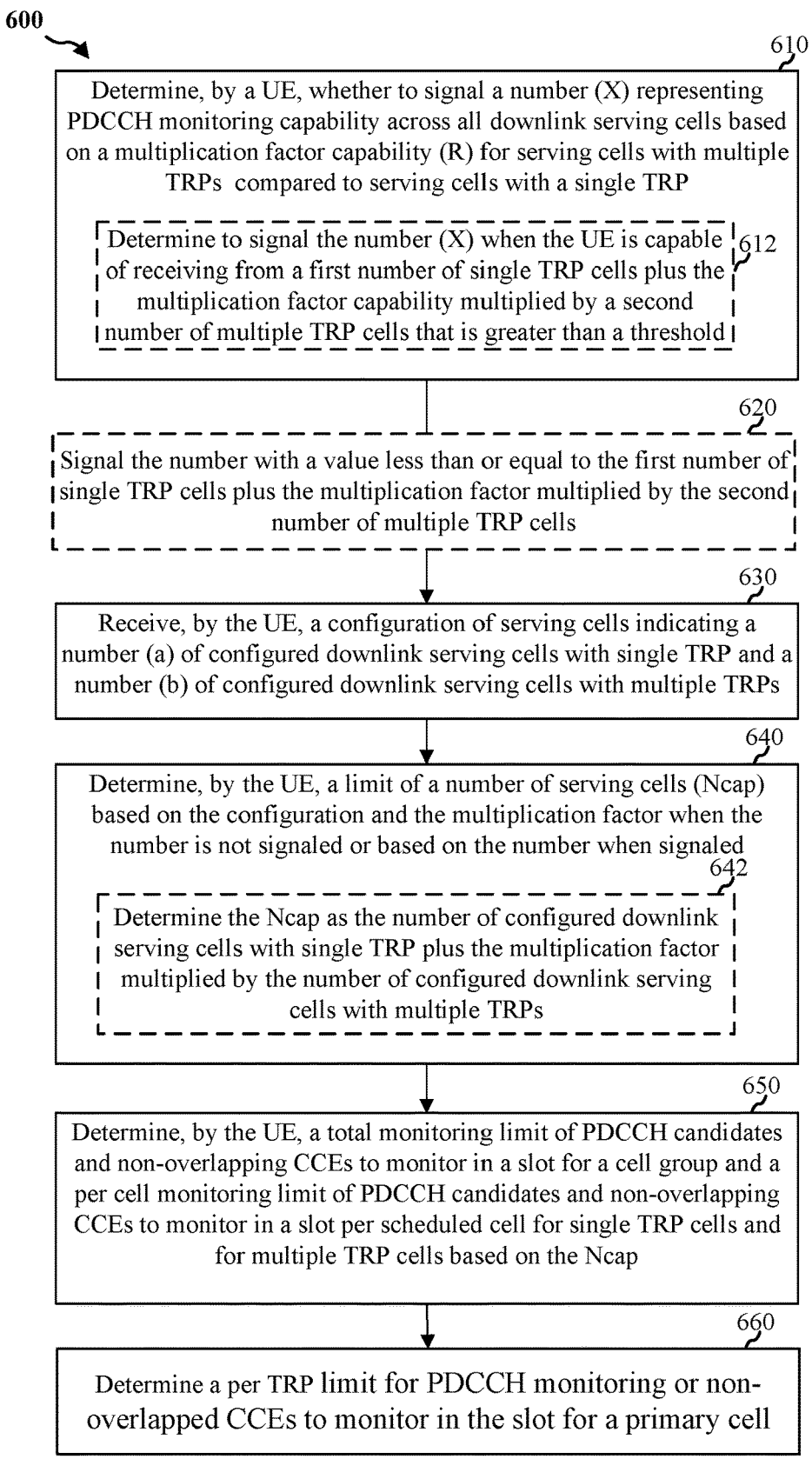
FIG. 6 is a flowchart of a first example method of wireless communication for determining PDCCH decoding limits based on a multiplication factor.

FIG. 6 is a flowchart of a method 600 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for establishing limits for blind decoding of PDCCH.

In block 610, the method 600 may include determining, by a UE, whether to signal a number (X) representing PDCCH monitoring capability across all downlink serving cells based on a multiplication factor capability (R) for serving cells with multiple transmit-receive points (TRPs) compared to serving cells with a single TRP. In an aspect, for example, the UE 104, and/or the controller/processor 359 may execute the PDCCH limit component 140 and/or the capability component 141 to determine whether to signal the number (X) 512 representing PDCCH monitoring capability across all downlink serving cells based on the multiplication factor capability (R) for serving cells with multiple TRPs (e.g., cell 408) compared to serving cells with a single TRP (e.g., cell 418). Accordingly, the UE 104 and/or the controller/processor 359 executing the PDCCH limit component 140 and/or the capability component 141 may provide means for determining, by a UE, whether to signal a number representing PDCCH monitoring capability across all downlink serving cells based on a multiplication factor for serving cells with multiple transmit-receive points compared to serving cells with a single TRP.

For example, at sub-block 612, the block 610 may include determining to signal the number (X) when the UE is capable of receiving from a first number of single TRP cells plus the multiplication factor multiplied by a second number of multiple TRP cells that is greater than a threshold. For example, the UE 104 may signal the value of X, if the UE 104 indicates capability of A or more serving cells with single TRP and B or more serving cells with multiple TRP such that A+R·B>4. If A+R·B≤4, the UE 104 may refrain from signaling the number X.

In block 620, the method 600 may optionally include signaling the number (X) with a value less than or equal to the first number of single TRP cells plus the multiplication factor multiplied by a second number of multiple TRP cells that the UE is capable of supporting. In an aspect, for example, the UE 104, and/or the controller/processor 359 may execute the PDCCH limit component 140 and/or the capability component 141 to signal the number X 512 with a value less than or equal to the first number of single TRP cells plus the multiplication factor multiplied by the second number of multiple TRP cells. In an aspect, the capability component 141 may signal the multiplication factor capability (R) 518. For example, the capability component 141 may signal the multiplication factor capability (R) 518 regardless of whether the number (X) is signaled. The block 620 may be performed in response to the sub-block 612. Accordingly, the UE 104 and/or the controller/processor 359 executing the PDCCH limit component 140 and/or the capability component 141 may provide means for signaling the number with a value less than or equal to the first number of single TRP cells plus the multiplication factor multiplied by a second number of multiple TRP cells that the UE is capable of supporting.

In block 630, the method 600 may include receiving, by the UE, a configuration of serving cells indicating a number (a) of configured downlink serving cells with single TRP and a number (b) of configured downlink serving cells with multiple TRPs. In an aspect, for example, the UE 104, and/or the controller/processor 359 may execute the PDCCH limit component 140 and/or the configuration component 142 to receive the cell configuration 520 of serving cells indicating a number (a) 522 of configured downlink serving cells with single TRP and a number (b) 524 of configured downlink serving cells with multiple TRPs. In an aspect, the cell configuration 520 may include a value for the configured multiplication factor (r) 530. The configuration component 142 may receive the configuration 520 and set the value of the configured multiplication factor (r) to the received value in the configuration 520. Accordingly, the UE 104 and/or the controller/processor 359 executing the PDCCH limit component 140 and/or the configuration component 142 may provide means for receiving, by the UE, a configuration of serving cells indicating a number of configured downlink serving cells with single TRP and a number of configured downlink serving cells with multiple TRPs.

In block 640, the method 600 may include determining, by the UE, a limit of a number of serving cells (Ncap) based on the configuration and the multiplication factor when the number X is not signaled or based on the signaled value of the number X when the number X is signaled. In an aspect, for example, the UE 104, and/or the controller/processor 359 may execute the PDCCH limit component 140 to determine the Ncap based on the configuration and the multiplication factor, r, when the number X is not signaled or based on the value of the number X when signaled. Accordingly, the UE 104 and/or the controller/processor 359 executing the PDCCH limit component 140 may provide means for determining, by the UE, a limit of a number of serving cells based on the configuration and the multiplication factor when the number X is not signaled or based on the value of the number X when signaled.

For example, in sub-block 642, the block 640 may include determining the Ncap as the number of configured downlink serving cells with single TRP plus the multiplication factor multiplied by the number of configured downlink serving cells with multiple TRPs. That is, when the UE 104 does not report X, the Ncap may be set to a+r·b. If the UE 104 did report X in block 630, the Ncap may be set to X.

In block 650, the method 600 may include determining, by the UE, a total monitoring limit of PDCCH candidates and non-overlapped CCEs to monitor in a slot for a cell group and a per cell monitoring limit of PDCCH candidates and non-overlapped CCEs to monitor in a slot per scheduled cell for single TRP cells and for multiple TRP cells based on the Ncap. In an aspect, for example, the UE 104, and/or the controller/processor 359 may execute the PDCCH limit component 140 and/or the limit component 144 to determine the total monitoring limit of PDCCH candidates and non-overlapped CCEs to monitor in a slot for a cell group and a per cell monitoring limit of PDCCH candidates and non-overlapped CCEs to monitor in a slot per scheduled cell for single TRP cells and for multiple TRP cells based on the Ncap. Further details of determining the total monitoring limit and the per cell monitoring limits are discussed below with respect to FIG. 7. Accordingly, the UE 104 and/or the controller/processor 359 executing the PDCCH limit component 140 and/or the limit component 144 may provide means for determining, by the UE, a total monitoring limit of PDCCH candidates and non-overlapped CCEs to monitor in a slot for a cell group and a per cell monitoring limit of PDCCH candidates and non-overlapped CCEs to monitor in a slot per scheduled cell for single TRP cells and for multiple TRP cells based on the Ncap.

In block 660, the method 600 may include determining a per TRP limit for PDCCH monitoring or for non-overlapped CCEs to monitor in the slot for a primary cell. In an aspect, for example, the UE 104, and/or the controller/processor 359 may execute the PDCCH limit component 140 and/or the limit component 144 to determine a per TRP limit for PDCCH monitoring or for non-overlapped CCEs to monitor in the slot for a primary cell. For CORESETs configured for the same TRP (i.e., same higher layer index configured per CORESET per "PDCCH-Config"), the maximum numbers of monitored PDCCH candidates and non-overlapped CCEs per slot for a DL BWP may be no greater than the limits defined in Table 10.1-2 and Table 10.1-3 above. Therefore, the limit component 144 may determine the per TRP limit for PDCCH monitoring or for non-overlapped CCEs to monitor in the slot for a cell based on the numerology n of the cell. Accordingly, the UE 104 and/or the controller/processor 359 executing the PDCCH limit component 140 and/or the limit component 144 may provide means for determining a per TRP limit for PDCCH monitoring or for non-overlapped CCEs to monitor in the slot for a primary cell.

Figure 7:
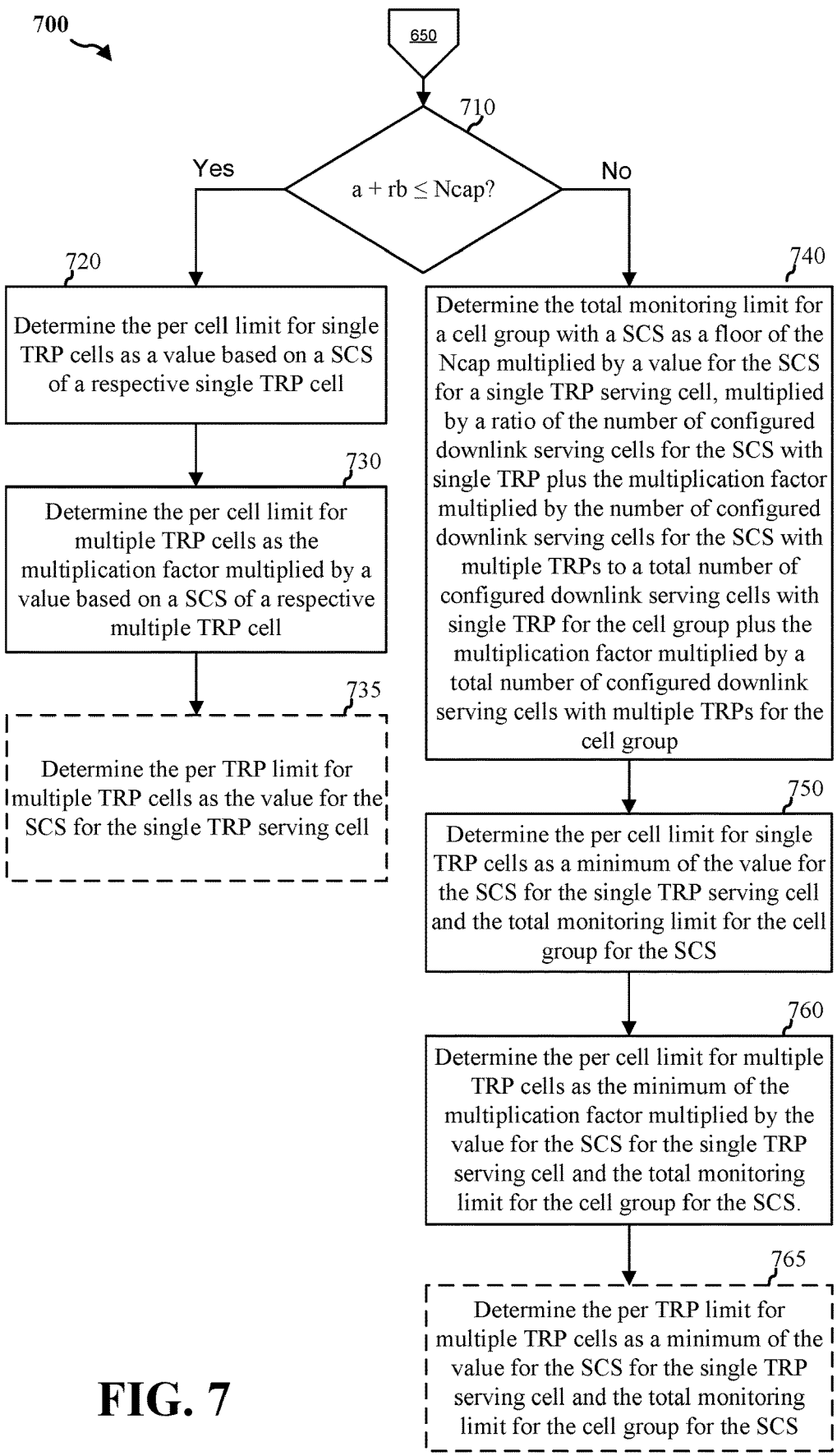
FIG. 7 is a flowchart of an example method of determining PDCCH decoding limits based on a limit on a number of cells using a multiplication factor.

FIG. 7 is a flowchart of a method 700 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for determining a total monitoring limit and per cell monitoring limits. In an aspect, the method 800 may correspond to the block 650 of the method 600. The method 700 may be performed by the limit component 144.

At decision block 710, the method 700 may include determining whether an equivalent number of serving cells (a+rb) is less than or equal to the Ncap. The equivalent number of serving cells may be determined based on configured cells for each SCS n. For example, $N_{cells, sTRP}^{DL,\mu}$ and $N_{cells, mTRP}^{DL,\mu}$ representing the number of downlink cells that the UE 104 is configured with single TRP and multi-TRP operation, respectively, and having active downlink BWP with SCS μ. Accordingly, in the case of 4 maximum downlink BWP, the equivalent number of serving cells may be expressed as $\Sigma_{\mu=0}^{3} N_{cells,sTRP}^{DL,\mu} + r \Sigma_{\mu=0}^{3} N_{cells,mTRP}^{DL,\mu}$. That is, the limit component 144 may determine that the number of configured downlink serving cells with single TRP plus the multiplication factor multiplied by the number of configured downlink serving cells with multiple TRPs is less than or equal to the Ncap. If $\Sigma_{\mu=0}^{3} N_{cells,sTRP}^{DL,\mu} + r \Sigma_{\mu=0}^{3} N_{cells,mTRP}^{DL,\mu} \leq N_{cells}^{cap}$, the method 700 may proceed to block 720. If $\Sigma_{\mu=0}^{3} N_{cells,sTRP}^{DL,\mu} + r \Sigma_{\mu=0}^{3} N_{cells,mTRP}^{DL,\mu} \geq N_{cells}^{cap}$, the method 700 may proceed to block 740. That is, the limit component 144 may determine that the number of configured downlink serving cells with single TRP plus the multiplication factor multiplied by the number of configured downlink serving cells with multiple TRPs is greater than the Ncap.

In block 720, the method 700 may include determining the per cell limit for single TRP cells as a value based on the SCS of a respective single TRP cell. For example, the limit component 144 may determine the per cell limit for single TRP cells as a value based on the SCS of a respective single TRP cell. That is, the limit of PDCCH candidates per scheduled cell for cells configured with single TRP may $M_{PDCCH}^{slot,\mu}$ and the limit of non-overlapped CCEs per scheduled cell for cells configured with single TRP may be $C_{PDCCH}^{max,slot,\mu}$.

In block 730, the method 700 may include determining the per cell limit for multiple TRP cells as the multiplication factor multiplied by a value based on a SCS of a respective multiple TRP cell. For example, the limit component 144 may determine the per cell limit for multiple TRP cells as the multiplication factor multiplied by a value based on a SCS of a respective multiple TRP cell. That is, the limit of PDCCH candidates per scheduled cell for cells configured with multiple TRPs may be $rM_{PDCCH}^{slot,\mu}$ and the limit of non-overlapped CCEs per scheduled cell for cells configured with multiple TRPs may be $rC_{PDCCH}^{slot,\mu}$.

In block 735, the method 700 may optionally include determining the per TRP limit for multiple TRP cells as a value based on the SCS of a respective single TRP cell. For example, the limit component 144 may determine the per TRP limit for multiple TRP cells as a value based on the SCS of a respective single TRP cell. That is, the limit of PDCCH candidates per TRP for cells configured with multiple TRP may be $M_{PDCCH}^{slot,\mu}$ and the limit of non-overlapped CCEs per scheduled cell for cells configured with multiple TRP may be $C_{PDCCH}^{slot,\mu}$.

In block 740, the method 700 may include determining the total monitoring limit for a cell group with a SCS as a floor of the Ncap multiplied by a value for the SCS for a single TRP serving cell, multiplied by a ratio of the number of configured downlink serving cells for the SCS with single TRP plus the multiplication factor multiplied by the number of configured downlink serving cells for the SCS with multiple TRPs to a total number of configured downlink serving cells with single TRP for the cell group plus the multiplication factor multiplied by a total number of configured downlink serving cells with multiple TRPs for the cell group. For instance, the limit component 144 may determine the total monitoring limit of PDCCH candidates for all downlink cells with a given SCS as $M_{PDCCH}^{slot,\mu} = \lfloor N_{cells}^{cap} \cdot M_{PDCCH}^{slot,\mu} \cdot (N_{cells,sTRP}^{DL,\mu} + N_{cells,mTRP}^{DL,\mu})/(\Sigma_{j=0}^{3} N_{cells,sTRP}^{DL,j} + r \Sigma_{j=0}^{3} N_{cells,mTRP}^{DL,j}) \rfloor$. Similarly, the limit component 144 may determine the total monitoring limit of non-overlapped CCEs for all downlink cells with a given SCS as $C_{PDCCH}^{total,slot,\mu} = \lfloor N_{cells}^{cap} \cdot C_{PDCCH}^{max,slot,\mu} \cdot (N_{cells,sTRP}^{DL,\mu} + rN_{cells,mTRP}^{DL,\mu})/(\Sigma_{j=0}^{3} N_{cells,sTRP}^{DL,j} + r \Sigma_{j=0}^{3} N_{cells,mTRP}^{DL,j}) \rfloor$.

In block 750, the method 700 may include determining the per cell limit for single TRP cells as a minimum of the value for the SCS for the single TRP serving cell and the total monitoring limit for the cell group for the SCS. For instance, the limit component 144 may determine the per cell limit for single TRP cells as $\min(M_{PDCCH}^{max,slot,\mu}, M_{PDCCH}^{total,slot,\mu})$ and determine the per cell limit of non-overlapped CCEs as $\min(C_{PDCCH}^{max,slot,\mu}, C_{PDCCH}^{total,slot,\mu})$.

In block 760, the method 700 may include determining the per cell limit for multiple TRP cells as the minimum of the multiplication factor multiplied by the value for the SCS for the single TRP serving cell and the total monitoring limit for the cell group for the SCS. For instance, the limit component 144 may determine the per cell limit of PDCCH candidates for multiple TRP cells as $\min(rM_{PDCCH}^{max,slot,\mu}, M_{PDCCH}^{total,slot,\mu})$ and determine the per cell limit of non-overlapped CCEs as $\min((rC_{PDCCH}^{max,slot,\mu}, M_{PDCCH}^{total,slot,\mu}))$.

In block 765, the method 700 may include determining the per TRP limit for multiple TRP cells as a minimum of the value for the SCS for the single TRP serving cell and the total monitoring limit for the cell group for the SCS. For instance, the limit component 144 may determine the per cell limit for multiple TRP cells as $\min((M_{PDCCH}^{max,slot,\mu}, M_{PDCCH}^{total,slot,\mu}))$ and determine the per cell limit of non-overlapped CCEs as $\min((C_{PDCCH}^{max,slot,\mu}, C_{PDCCH}^{total,slot,\mu}))$.

Figure 8:
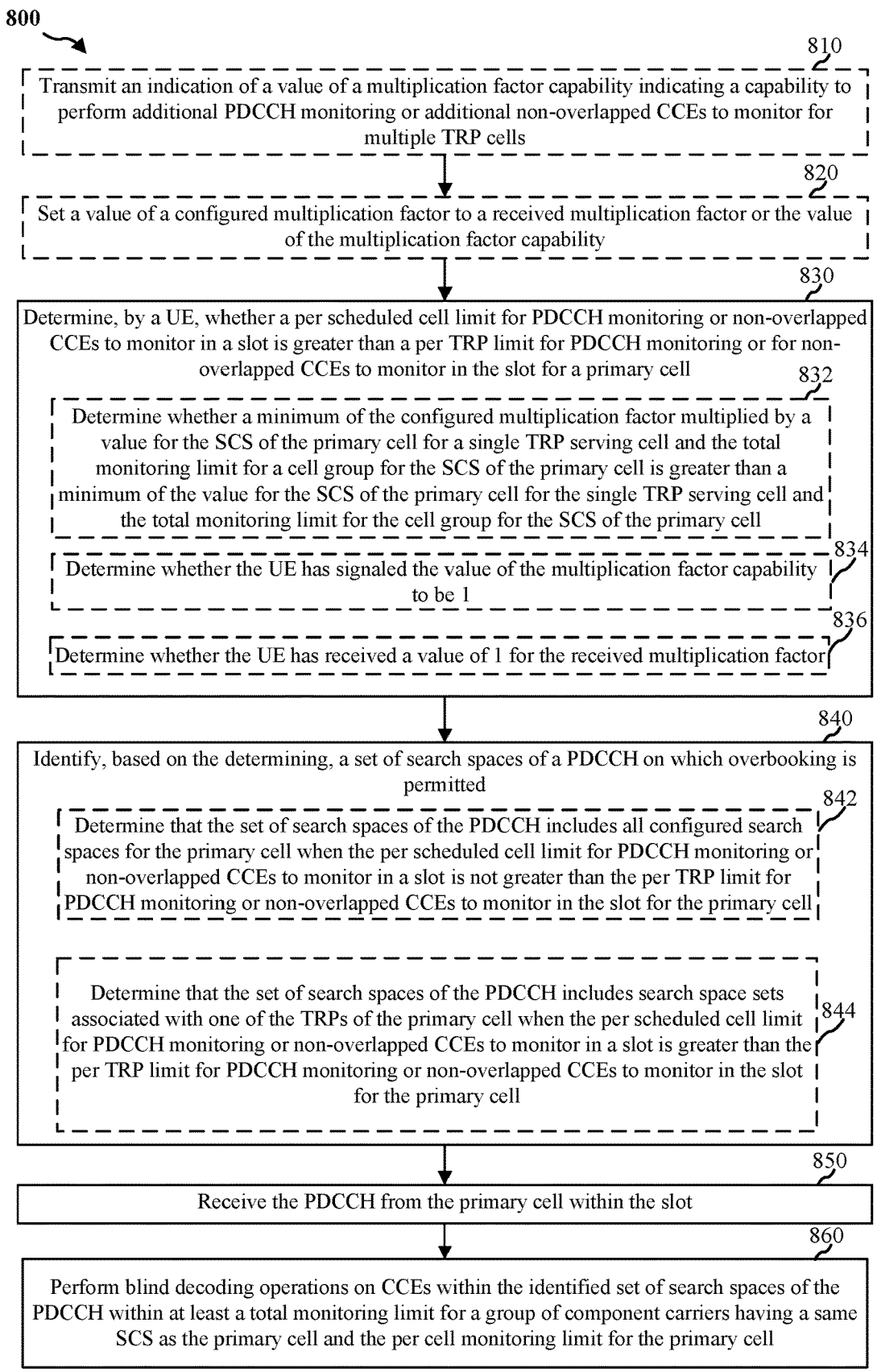
FIG. 8 is a flowchart of an example method of wireless communication according to PDCCH decoding limits.

FIG. 8 is a flowchart of a method 800 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for performing overbooking based on limits of PDCCH decoding. The method 800 may be performed by the UE 104 including the PDCCH limit component 140.

In block 810, the method 800 may optionally include transmitting an indication of a value of a multiplication factor capability indicating a capability to perform additional PDCCH monitoring or additional non-overlapped CCEs to monitor for multiple TRP cells. In an aspect, for example, the UE 104, the TX processor 368, the controller/processor 359, and/or the processor 1112 may execute the PDCCH limit component 140 and/or the capability component 141 to transmit the indication of the value of the multiplication factor capability (e.g., R 518) indicating a capability to perform additional PDCCH monitoring or additional non-overlapped CCEs to monitor for multiple TRP cells. The value of R 518 may be one or more values supported by the UE 104. For a maximum of 2 TRPs per cell, the value of R 518 may be between 1 and 2, inclusive. For example, the UE 104 may report multiple values of R 518 and corresponding values of A and B pairs depending on UE capability. Accordingly, the UE 104, the TX processor 368, the controller/processor 359, and/or the processor 1112 executing the PDCCH limit component 140 and/or the capability component 141 may provide means for transmitting an indication of a value of a multiplication factor capability indicating a capability to perform additional PDCCH monitoring or additional non-overlapped CCEs to monitor for multiple TRP cells.

In block 820, the method 800 may optionally include setting a value of a configured multiplication factor to a received multiplication factor or the value of the multiplication factor capability. In an aspect, for example, the UE 104, the RX processor 356, the controller/processor 359, and/or the processor 1112 may execute the PDCCH limit component 140 and/or the configuration component 142 to set the value of the configured multiplication factor (e.g., r 530) to the received multiplication factor or the value of the multiplication factor capability (e.g., R 518). For example, if the UE 104 receives an RRC configuration of r 530, the configuration component 142 may set the value of r 530 to the received value, which may be 1 or the value of R 518. If the UE 104 does not report R 518 or no RRC configuration of r 530 is received, the configuration component 142 may set the value of r 530 to the value of R 518. Accordingly, the UE 104, the RX processor 356, the controller/processor 359, and/or the processor 1112 executing the PDCCH limit component 140 and/or the configuration component 142 may provide means for setting a value of a configured multiplication factor to a received multiplication factor or the value of the multiplication factor capability.

In block 830, the method 800 may include determining, by a UE, whether a per scheduled cell limit for PDCCH monitoring or for non-overlapped control CCEs to monitor in a slot is greater than a per TRP limit for PDCCH monitoring or for non-overlapped CCEs to monitor in the slot for a primary cell. In an aspect, for example, the UE 104, the RX processor 356, the controller/processor 359, and/or the processor 1112 may execute the PDCCH limit component 140 and/or the limit component 144 to determine, by the UE 104, whether a per scheduled cell limit for PDCCH monitoring ($\min(r \cdot M_{PDCCH}^{max,\mu}, M_{PDCCH}^{total,\mu})$) or for non-overlapped control CCEs to monitor (min ($r \cdot C_{PDCCH}^{max,slot,\mu}, C_{PDCCH}^{total,slot,\mu}$)) in a slot is greater than a per TRP limit ($\min(M_{PDCCH}^{max,\mu}, M_{PDCCH}^{total,\mu})$) for PDCCH monitoring or for non-overlapped CCEs (min ($C_{PDCCH}^{max,slot,\mu}, C_{PDCCH}^{total,slot,\mu}$)) to monitor in the slot for a primary cell. For example, in sub-block 832, the block 830 may include determining whether a minimum of the configured multiplication factor (r 530) multiplied by a value for the SCS of the primary cell for a single TRP serving cell ($M_{PDCCH}^{max,\mu}$ or $C_{PDCCH}^{max,slot,\mu}$) and the total monitoring limit for a cell group for the SCS of the primary cell ($M_{PDCCH}^{total,\mu}$ or $C_{PDCCH}^{total,slot,\mu}$) is greater than a minimum of the value for the SCS of the primary cell for the single TRP serving cell ($M_{PDCCH}^{max,\mu}$ or $C_{PDCCH}^{max,slot,\mu}$) and the total monitoring limit for the cell group for the SCS of the primary cell ($M_{PDCCH}^{total,\mu}$ or $C_{PDCCH}^{total,slot,\mu}$) For instance, this condition may not be satisfied when R 518 equals 1 or when r 530 equals 1. Accordingly, at block 834, the block 830 may include determining that the UE has signaled a multiplication factor capability of 1. Or at block 836, the block 830 may include determining that the UE has received a configured multiplication factor of 1. In another aspect, the block 830 may include determining that the total monitoring limit for the cell group for the SCS is less than or equal to the value for the SCS of the primary cell for the single TRP serving cell (i.e. $M_{PDCCH}^{total,\mu} \leq M_{PDCCH}^{max,\mu}$ or $C_{PDCCH}^{total,slot,\mu} \leq C_{PDCCH}^{max,slot,\mu}$). Accordingly, the UE 104, the RX processor 356, the controller/processor 359, and/or the processor 1112 executing the PDCCH limit component 140 and/or the limit component 144 may provide means for determining, by a UE, whether a per scheduled cell limit for PDCCH monitoring or for non-overlapped control CCEs to monitor in a slot is greater than a per TRP limit for PDCCH monitoring or for non-overlapped CCEs to monitor in the slot for a primary cell.

In block 840, the method 800 may include identifying, based on the determining, a set of search spaces of a PDCCH on which overbooking is permitted. In an aspect, for example, the UE 104, the RX processor 356, the controller/processor 359, and/or the processor 1112 may execute the PDCCH limit component 140 and/or the search space component 143 to identify, based on the determining, a set of search spaces of the PDCCH on which overbooking is permitted. For example, in sub-block 842, the overbooking component 145 may determine that the set of search spaces of the PDCCH includes all configured search spaces for the primary cell when the per scheduled cell limit for PDCCH monitoring or for non-overlapped CCEs to monitor in a slot is not greater than the per TRP limit for PDCCH monitoring or for non-overlapped CCEs to monitor in the slot for the primary cell. In contrast, at sub-block 844, the overbooking component 145 may determine that the set of search spaces of the PDCCH includes search space sets associated with one of the TRPs of the primary cell when the per scheduled cell limit for PDCCH monitoring or for non-overlapped CCEs to monitor in a slot is greater than the per TRP limit for PDCCH monitoring or for non-overlapped CCEs to monitor in the slot for the primary cell. For example, the search space sets associated with one of the TRPs of the primary cell may be configured with CORESETs that are associated with a corresponding configured value of a higher layer index per CORESET (e.g., a value of 0 or 1). The corresponding configured value of the higher layer index per CORESET may be associated with a TRP. In an implementation, the corresponding configured value of the higher layer index per CORESET is 0. For example, the corresponding configured value of the higher layer index per CORESET may be configured based on a standard, regulation, or higher layer signaling (e.g., RRC signaling). As another example, the corresponding configured value of the higher layer index per CORESET is a higher layer index value per CORESET associated with a CORESET 0. Accordingly, the UE 104, the RX processor 356, the controller/processor 359, and/or the processor 1112 executing the PDCCH limit component 140 and/or the search space component 143 may provide means for identifying, based on the determining, a set of search spaces on which overbooking is permitted In block 850, the method 800 may include receiving the PDCCH from the primary cell within the slot. In an aspect, for example, the UE 104, the RX processor 356, the controller/processor 359, and/or the processor 1112 may execute the PDCCH limit component 140 to receive the PDCCH (e.g., PDCCH1 420 or PDCCH2 424) from the primary cell (e.g., base station 402). Accordingly, the UE 104, the RX processor 356, the controller/processor 359, and/or the processor 1112 executing the PDCCH limit component 140 may provide means for receiving the PDCCH from the primary cell within the slot.

In block 860, the method 800 may include performing blind decoding operations on CCEs within the identified set of search spaces of the PDCCH within at least a total monitoring limit for a group of component carriers having a same SCS as the primary cell and the per cell monitoring limit for the primary cell. In an aspect, for example, the UE 104, the RX processor 356, the controller/processor 359, and/or the processor 1112 may execute the PDCCH limit component 140 and/or the overbooking component 145 to perform blind decoding operations on CCEs within the identified set of search spaces of the PDCCH (e.g., PDCCH1 420 or PDCCH2 424) within at least a total monitoring limit for a group of component carriers (e.g., including base station 412 and base station 452) having a same SCS as the primary cell and the per cell monitoring limit for the primary cell. In an aspect, performing blind decoding operations on CCEs within the identified set of search spaces is also within the per TRP limit for the primary cell. As discussed above, the total monitoring limit, the per cell monitoring limit, and the per TRP limit may include both the limit for monitored PDCCH candidates and the limit for non-overlapped control CCEs to monitor. Accordingly, the UE 104, the RX processor 356, the controller/processor 359, and/or the processor 1112 executing the PDCCH limit component 140 and/or the overbooking component 145 may provide means for performing blind decoding operations on CCEs within the identified set of search spaces of the PDCCH within at least a total monitoring limit for a group of component carriers having a same SCS as the primary cell and the per cell monitoring limit for the primary cell.

Figure 9:
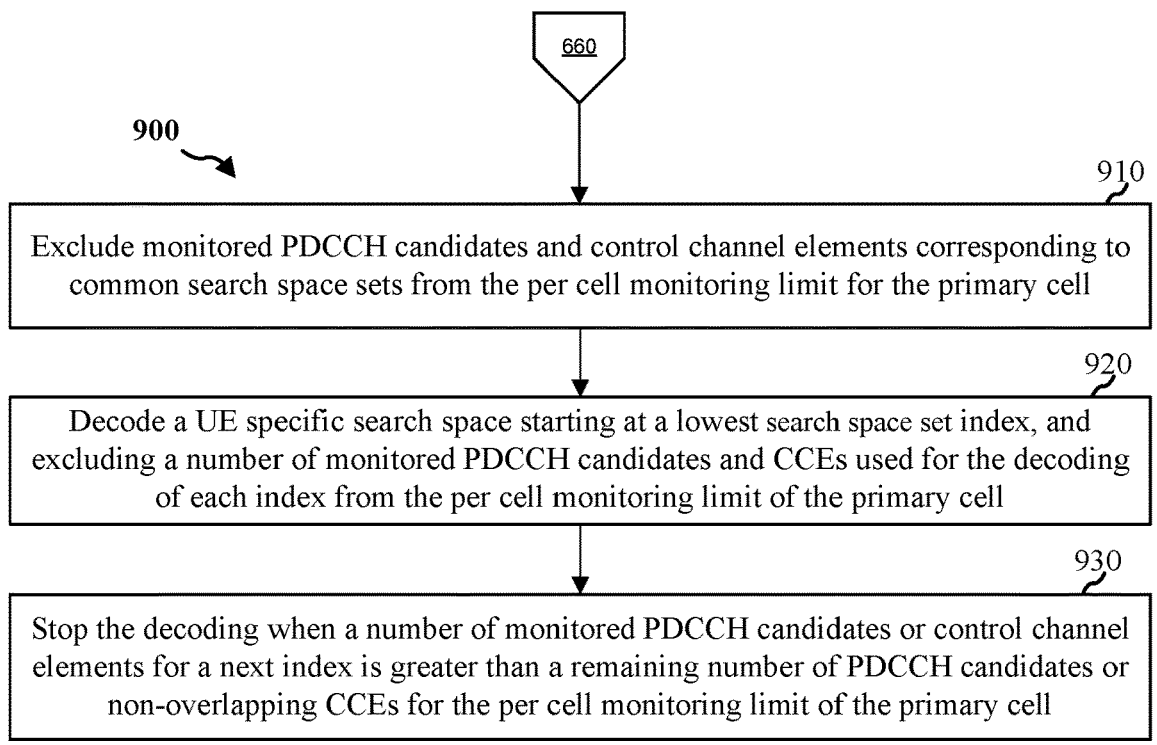
FIG. 9 is a flowchart of an example method for applying per cell PDCCH limits to an overbooking scenario.

FIG. 9 is a flowchart of a method 900 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for performing overbooking. In an aspect, the method 900 may be performed by the overbooking component 145. The method 900 may correspond to the block 860 of method 800. In an aspect, the method 900 may be performed in response to determining that the per scheduled cell limit for PDCCH monitoring or for non-overlapped CCEs to monitor in a slot is not greater than a per TRP limit for PDCCH monitoring or for non-overlapped CCEs to monitor in the slot for a primary cell in block 830. The set of search spaces may include all configured search spaces for the primary cell as identified in sub-block 842.

At block 910, the method 900 may include excluding monitored PDCCH candidates and control channel elements corresponding to common search space sets from the per cell monitoring limit for the primary cell. In an aspect, for example, the overbooking component 145 may exclude monitored PDCCH candidates and control channel elements corresponding to common search space sets from the per cell monitoring limit for the primary cell. In the case of overbooking, the PDCCH candidates and CCEs for the common search spaces may be mandatory and count toward the per cell limit. Accordingly, the overbooking component 145 may subtract the monitored PDCCH candidates and CCEs for the common search spaces from the respective limits.

At block 920, the method 900 may include decoding a UE specific search space starting at a lowest search space set index, and excluding a number of monitored PDCCH candidates and CCEs used for the decoding of each index from the per cell monitoring limit of the primary cell. In an aspect, for example, the overbooking component 145 may decode the UE specific search space starting at the lowest search space set index, and exclude a number of monitored PDCCH candidates and CCEs used for the decoding of each search space set index from the per cell monitoring limit of the primary cell. That is, the UE may perform the decoding operations for each search space set index and subtract the monitored PDCCH candidates and CCEs from the respective per cell limits.

At block 930, the method 900 may include stopping the decoding when a number of configured monitored PDCCH candidates or control channel elements for a next search space set index is greater than a remaining number of PDCCH candidates or non-overlapped CCEs for the per cell monitoring limit of the primary cell. In an aspect, for example, the overbooking component 145 may stop the decoding when the number of configured monitored PDCCH candidates or control channel elements for a next search space set index is greater than a remaining number of PDCCH candidates or non-overlapped CCEs for the per cell monitoring limit of the primary cell. Accordingly, the overbooking component 145 may stop decoding based on the per cell limit even if additional search spaces are configured for the primary serving cell.

Figure 10:
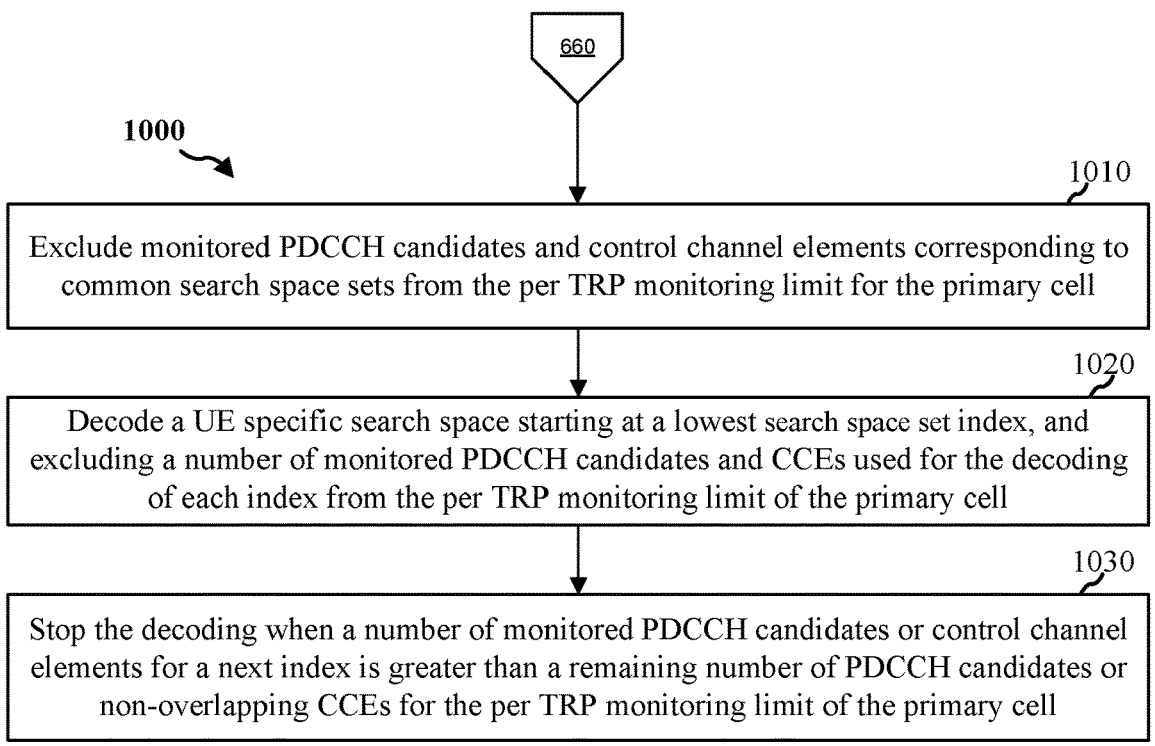
FIG. 10 is a flowchart of an example method for applying per TRP PDCCH limits to an overbooking scenario.

FIG. 10 is a flowchart of a method 1000 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for performing overbooking. In an aspect, the method 1000 may be performed by the overbooking component 145. The method 1000 may correspond to the block 860 of method 800. In an aspect, the method 1000 may be performed in response to determining that the per scheduled cell limit for PDCCH monitoring or for non-overlapped CCEs to monitor in a slot is greater than a per TRP limit for PDCCH monitoring or for non-overlapped CCEs to monitor in the slot for a primary cell in block 830. The set of search spaces may include search space sets associated with one of the TRPs of the primary cell as identified in sub-block 844.

At block 1010, the method 1000 may include excluding monitored PDCCH candidates and control channel elements corresponding to common search space sets from the per TRP monitoring limit for the primary cell. In an aspect, for example, the overbooking component 145 may exclude monitored PDCCH candidates and control channel elements corresponding to common search space sets from the per TRP monitoring limit for the primary cell. In the case of overbooking, the PDCCH candidates and CCEs for the common search spaces may be mandatory and count toward the per TRP limit. Accordingly, the overbooking component 145 may subtract the monitored PDCCH candidates and CCEs for the common search spaces from the respective limits.

At block 1020, the method 1000 may include decoding a UE specific search space starting at a lowest search space set index, and excluding a number of monitored PDCCH candidates and CCEs used for the decoding of each index from the per TRP monitoring limit of the primary cell. In an aspect, for example, the overbooking component 145 may decode the UE specific search space starting at the lowest search space set index, and exclude a number of monitored PDCCH candidates and CCEs used for the decoding of each search space set index from the per cell monitoring limit of the primary cell. That is, the UE may perform the decoding operations for each search space set index and subtract the monitored PDCCH candidates and CCEs from the respective per TRP limits.

At block 1030, the method 900 may include stopping the decoding when a number of configured monitored PDCCH candidates or control channel elements for a next search space set index is greater than a remaining number of PDCCH candidates or non-overlapped CCEs for the per TRP monitoring limit of the primary cell. In an aspect, for example, the overbooking component 145 may stop the decoding when the number of configured monitored PDCCH candidates or control channel elements for a next search space set index is greater than a remaining number of PDCCH candidates or non-overlapped CCEs for the per TRP monitoring limit of the primary cell. Accordingly, the overbooking component 145 may stop decoding based on the per TRP limit even if additional search spaces are configured for the primary serving cell.

Figure 11:
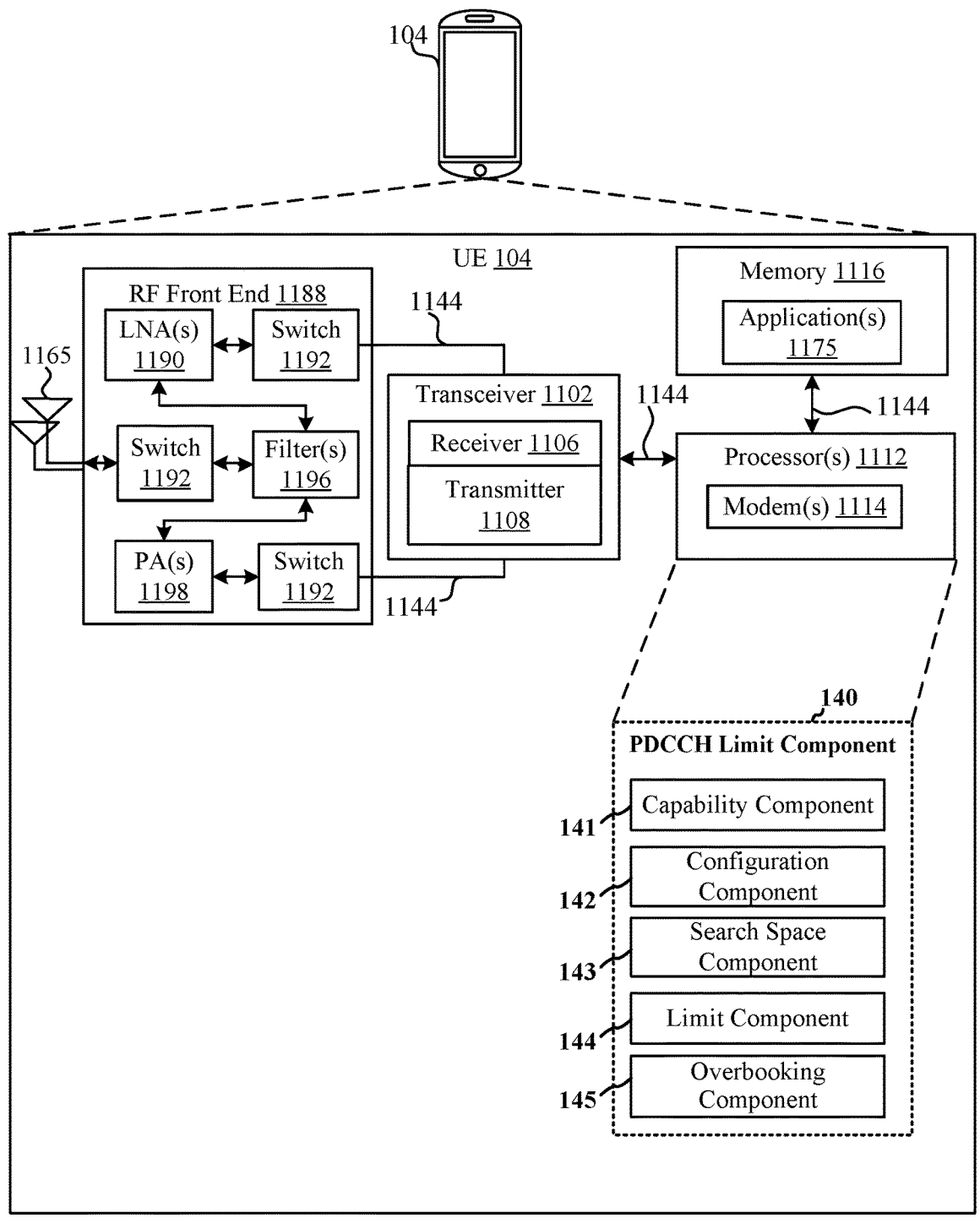
FIG. 11 is a schematic diagram of example components of the UE of FIG. 1.

Referring to FIG. 11, one example of an implementation of UE 104 may include a variety of components, some of which have already been described above, but including components such as one or more processors 1112 and memory 1116 and transceiver 1102 in communication via one or more buses 1144, which may operate in conjunction with modem 1114, and PDCCH limit component 140 to enable one or more of the functions described herein related to limits on PDCCH decoding. Further, the one or more processors 1112, modem 1114, memory 1116, transceiver 1102, RF front end 1188 and one or more antennas 1165 may be configured to support voice and/or data calls (simultaneously or non-simultaneously) in one or more radio access technologies. The antennas 1165 may include one or more antennas, antenna elements, and/or antenna arrays.

In an aspect, the one or more processors 1112 may include a modem 1114 that uses one or more modem processors. The various functions related to PDCCH limit component 140 may be included in modem 1114 and/or processors 1112 and, in an aspect, may be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with PDCCH limit component 140 may be performed by transceiver 1102.

Also, memory 1116 may be configured to store data used herein and/or local versions of applications 1175, PDCCH limit component 140 and/or one or more of subcomponents thereof being executed by at least one processor 1112. Memory 1116 may include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining PDCCH limit component 140 and/or one or more of subcomponents thereof, and/or data associated therewith, when UE 104 is operating at least one processor 1112 to execute PDCCH limit component 140 and/or one or more subcomponents thereof.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 102. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 104 may include RF front end 1188, which may operate in communication with one or more antennas 1165 and transceiver 1102 for receiving and transmitting radio transmissions, for example, wireless communications transmitted by at least one base station 102 or wireless transmissions transmitted by UE 104. RF front end 1188 may be connected to one or more antennas 1165 and may include one or more low-noise amplifiers (LNAs) 1190, one or more switches 1192, one or more power amplifiers (PAs) 1198, and one or more filters 1196 for transmitting and receiving RF signals.

In an aspect, LNA 1190 may amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 may be used by RF front end 1188 to filter a received signal to obtain an input RF signal. Similarly, in an aspect, for example, a respective filter 1196 may be used to filter an output from a respective PA 1198 to produce an output signal for transmission. In an aspect, each filter 1196 may be connected to a specific LNA 1190 and/or PA 1198. In an aspect, RF front end 1188 may use one or more switches 1192 to select a transmit or receive path using a specified filter 1196, LNA 1190, and/or PA 1198, based on a configuration as specified by transceiver 1102 and/or processor 1112.

As such, transceiver 1102 may be configured to transmit and receive wireless signals through one or more antennas 1165 via RF front end 1188. In an aspect, transceiver 1102 may be tuned to operate at specified frequencies such that UE 104 can communicate with, for example, one or more base stations 102 or one or more cells associated with one or more base stations 102. In an aspect, for example, modem 1114 may configure transceiver 1102 to operate at a specified frequency and power level based on the UE configuration of the UE 104 and the communication protocol used by modem 1114.

In an aspect, modem 1114 may be a multiband-multimode modem, which can process digital data and communicate with transceiver 1102 such that the digital data is sent and received using transceiver 1102. In an aspect, modem 1114 may be multiband and be configured to support multiple frequency bands for a specific communications protocol. In an aspect, modem 1114 may be multimode and be configured to support multiple operating networks and communications protocols. In an aspect, modem 1114 may control one or more components of UE 104 (e.g., RF front end 1188, transceiver 1102) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 12:
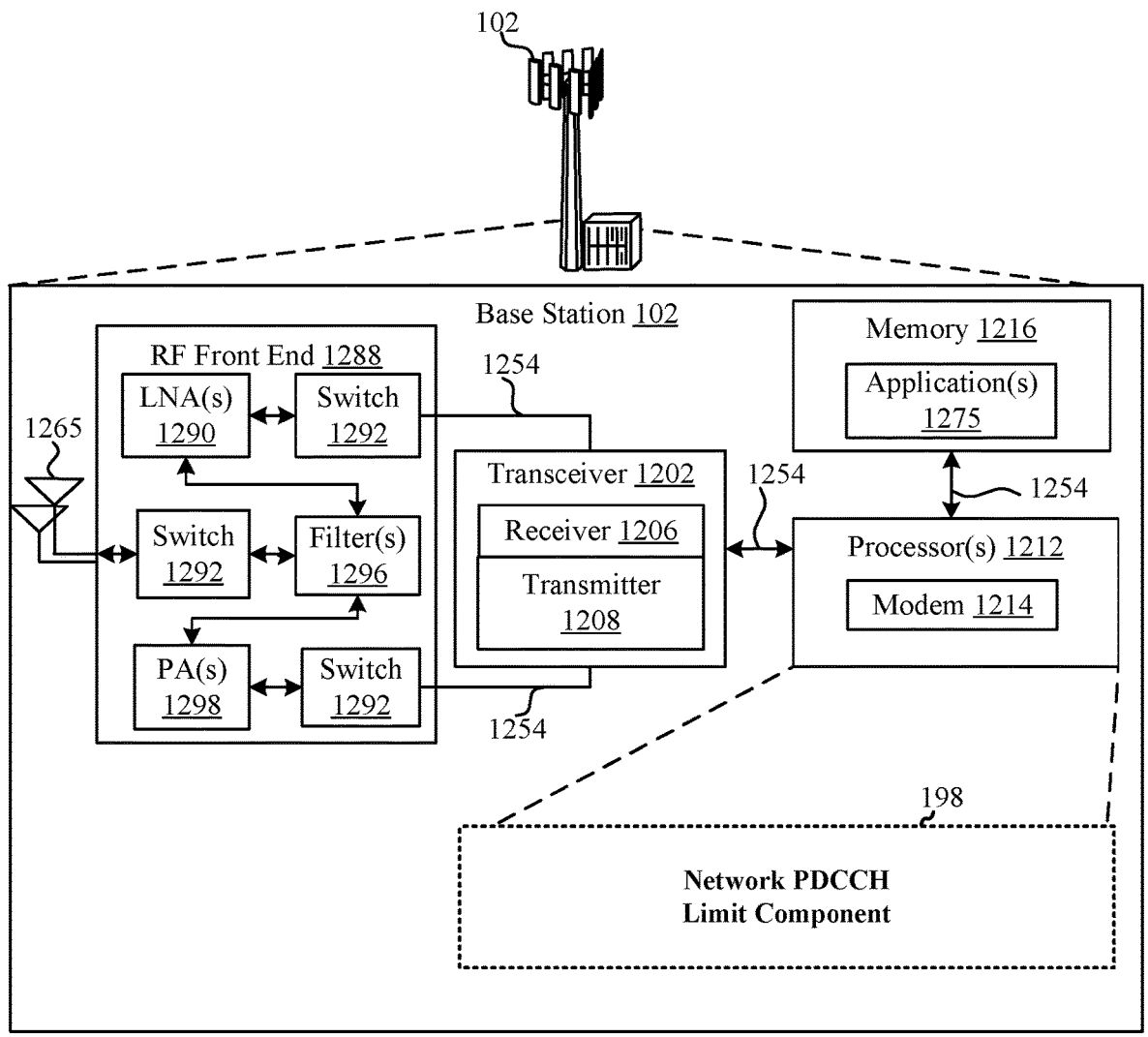
FIG. 12 is a schematic diagram of example components of the base station of FIG. 1.

Referring to FIG. 12, one example of an implementation of base station 102 may include a variety of components, some of which have already been described above, but including components such as one or more processors 1212 and memory 1216 and transceiver 1202 in communication via one or more buses 1254, which may operate in conjunction with modem 1214 and network PDCCH limit component 198 to enable one or more of the functions described herein related to PDCCH limits.

The transceiver 1202, receiver 1206, transmitter 1208, one or more processors 1212, memory 1216, applications 1275, buses 1254, RF front end 1288, LNAs 1290, switches 1292, filters 1296, PAs 1298, and one or more antennas 1265 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some Further Example Clauses

Implementation examples are described in the following numbered clauses:
1. A method of wireless communication, comprising:
   determining, by a UE, whether a per scheduled cell limit for physical downlink control channel (PDCCH) monitoring or for non-overlapped control channel elements (CCEs) to monitor in a slot is greater than a per transmit receive point (TRP) limit for PDCCH monitoring or for non-overlapped CCEs to monitor in the slot for a primary cell;
   identifying, based on the determining, a set of search spaces of a PDCCH on which overbooking is permitted;
   receiving the PDCCH from the primary cell within the slot; and
   performing blind decoding operations on CCEs within the identified set of search spaces of the PDCCH within at least a total monitoring limit for a group of component carriers having a same sub-carrier spacing (SCS) as the primary cell and the per cell monitoring limit for the primary cell.
2. The method of clause 1, wherein performing blind decoding operations on CCEs within the identified set of search spaces of the PDCCH is also within the per TRP limit for the primary cell.

3. The method of clause 1 or 2, further comprising:
   transmitting an indication of a value of a multiplication factor capability indicating a capability to perform additional PDCCH monitoring or additional non-overlapped CCEs to monitor for multiple TRP cells; and
   setting a value of a configured multiplication factor to a received multiplication factor or the value of the multiplication factor capability.
4. The method of clause 3, wherein the determining comprises determining whether a minimum of the configured multiplication factor multiplied by a value for the SCS of the primary cell for a single TRP serving cell and the total monitoring limit for a cell group for the SCS of the primary cell is greater than a minimum of the value for the SCS of the primary cell for the single TRP serving cell and the total monitoring limit for the cell group for the SCS of the primary cell.
5. The method of clause 4, wherein the determining comprises determining whether the total monitoring limit for the cell group for the SCS is less than or equal to the value for the SCS of the primary cell for the single TRP serving cell.
6. The method of clause 3, wherein the determining comprises determining whether the UE has signaled the value of the multiplication factor capability to be 1.
7. The method of clause 3, wherein the determining comprises determining whether the UE has received a value of 1 for the received multiplication factor.
8. The method of any of clauses 1-7, wherein identifying, based on the determining, the set of search spaces on which overbooking is permitted comprises determining that the set of search spaces of the PDCCH includes all configured search spaces for the primary cell when the per scheduled cell limit for PDCCH monitoring or for non-overlapped CCEs to monitor in the slot is not greater than the per TRP limit for PDCCH monitoring or for non-overlapped CCEs to monitor in the slot for the primary cell.
9. The method of clause 8, wherein performing blind decoding operations on CCEs within the identified set of search spaces of the PDCCH comprises:
   excluding monitored PDCCH candidates and CCEs corresponding to common search space sets from the per cell monitoring limit for the primary cell;
   decoding a UE specific search space starting at a lowest search space set index, and excluding a number of monitored PDCCH candidates and CCEs used for the decoding of each index from the per cell monitoring limit of the primary cell; and
   stopping the decoding when a number of configured monitored PDCCH candidates or CCEs for a next index is greater than a remaining number of PDCCH candidates or non-overlapped CCEs for the per cell monitoring limit of the primary cell.
10. The method of any of clauses 1-7, wherein identifying, based on the determining, the set of search spaces on which overbooking is permitted comprises determining that the set of search spaces of the PDCCH includes search space sets associated with one of the TRPs of the primary cell when the per scheduled cell limit for PDCCH monitoring or for non-overlapped CCEs to monitor in the slot is greater than the per TRP limit for PDCCH monitoring or for non-overlapped CCEs to monitor in the slot for the primary cell.
11. The method of clause 10, wherein the search space sets associated with one of the TRPs of the primary cell are configured with control resource sets (CORESETs) that are associated with a corresponding configured value of a higher layer index per CORESET.

12. The method of clause 11, wherein the corresponding configured value of the higher layer index per CORESET is associated with a TRP.

13. The method of clause 11, wherein the corresponding configured value of the higher layer index per CORESET is 0.

14. The method of clause 11, wherein the corresponding configured value of the higher layer index per CORESET is a higher layer index value per CORESET associated with a CORESET 0.

15. The method of clause 10, wherein performing blind decoding operations on CCEs within the identified set of search spaces of the PDCCH comprises:
   excluding monitored PDCCH candidates and CCEs corresponding to common search space sets from the per TRP monitoring limit for the primary cell;
   decoding a UE specific search space within the search space sets associated with the one of the TRPs starting at a lowest search space set index, and excluding a number of monitored PDCCH candidates and CCEs used for the decoding of each search space set index from the per TRP monitoring limit of the primary cell; and
   stopping the decoding when a number of configured monitored PDCCH candidates or CCEs for a next index is greater than a remaining number of PDCCH candidates or non-overlapped CCEs for the per TRP monitoring limit of the primary cell.

16. An apparatus for wireless communication, comprising:
   a memory storing computer-executable instructions; and
   a processor, communicatively coupled with the memory and configured to execute the instructions to:
   determine, by a UE, whether a per scheduled cell limit for physical downlink control channel (PDCCH) monitoring or for non-overlapped control channel elements (CCEs) to monitor in a slot is greater than a per transmit receive point (TRP) limit for PDCCH monitoring or for non-overlapped CCEs to monitor in the slot for a primary cell;
   identify, based on the determining, a set of search spaces of a PDCCH on which overbooking is permitted;
   receive the PDCCH from the primary cell within the slot; and
   perform blind decoding operations on CCEs within the identified set of search spaces of the PDCCH within at least a total monitoring limit for a group of component carriers having a same sub-carrier spacing (SCS) as the primary cell and the per cell monitoring limit for the primary cell.

17. The apparatus of clause 16, wherein the processor is configured to perform the blind decoding operations within the per TRP limit for the primary cell.

18. The apparatus of clause 16 or 17, wherein the processor is configured to:
   transmit an indication of a value of a multiplication factor capability indicating a capability to perform additional PDCCH monitoring or additional non-overlapped CCEs to monitor for multiple TRP cells; and
   set a value of a configured multiplication factor to a received multiplication factor or the value of the multiplication factor capability.

19. The apparatus of clause 18, wherein the processor is configured to determine whether a minimum of the configured multiplication factor multiplied by a value for the SCS of the primary cell for a single TRP serving cell and the total monitoring limit for a cell group for the SCS of the primary cell is greater than a minimum of the value for the SCS of the primary cell for the single TRP serving cell and the total monitoring limit for the cell group for the SCS of the primary cell.

20. The apparatus of clause 19, wherein the processor is configured to determine that the total monitoring limit for the cell group for the SCS is less than or equal to the value for the SCS of the primary cell for the single TRP serving cell.

21. The apparatus of clause 18, wherein the processor is configured to determine whether the UE has signaled the value of the multiplication factor capability to be 1.

22. The apparatus of clause 18, wherein the processor is configured to determine whether the UE has received a value of 1 for the received multiplication factor.

23. The apparatus of any of clauses 16-22, wherein the at least one processor is configured to determine that the set of search spaces of the PDCCH includes all configured search spaces for the primary cell when the per scheduled cell limit for PDCCH monitoring or for non-overlapped CCEs to monitor in the slot is not greater than the per TRP limit for PDCCH monitoring or for non-overlapped CCEs to monitor in the slot for the primary cell.

24. The apparatus of clause 23, wherein the at least one processor is configured to perform the blind decoding operations on CCEs within the identified set of search spaces of the PDCCH by:
   excluding monitored PDCCH candidates and CCEs corresponding to common search space sets from the per cell monitoring limit for the primary cell;
   decoding a UE specific search space starting at a lowest search space set index, and excluding a number of monitored PDCCH candidates and CCEs used for the decoding of each index from the per cell monitoring limit of the primary cell; and
   stopping the decoding when a number of configured monitored PDCCH candidates or CCEs for a next index is greater than a remaining number of PDCCH candidates or non-overlapped CCEs for the per cell monitoring limit of the primary cell.

25. The apparatus of any of clauses 16-22, wherein the at least one processor is configured to determine that the set of search spaces of the PDCCH includes search space sets associated with one of the TRPs of the primary cell when the per scheduled cell limit for PDCCH monitoring or for non-overlapped CCEs to monitor in the slot is greater than the per TRP limit for PDCCH monitoring or for non-overlapped CCEs to monitor in the slot for the primary cell.

26. The apparatus of clause 25, wherein the search space sets associated with one of the TRPs of the primary cell are configured with control resource sets (CORESETs) that are associated with a corresponding configured value of a higher layer index per CORESET.

27. The apparatus of clause 26, wherein the corresponding configured value of the higher layer index per CORESET is one of: associated with a TRP, a value of 0, or a higher layer index value per CORESET associated with a CORESET 0.

28. The apparatus of clause 25, wherein the at least one processor is configured to perform blind decoding operations on CCEs within the identified set of search spaces of the PDCCH by:
   excluding monitored PDCCH candidates and CCEs corresponding to common search space sets from the per TRP monitoring limit for the primary cell;
   decoding a UE specific search space within the search space sets associated with the one of the TRPs starting at a lowest search space set index, and excluding a number of monitored PDCCH candidates and CCEs used for the decoding of each search space set index from the per TRP monitoring limit of the primary cell; and stopping the decoding when a number of configured monitored PDCCH candidates or CCEs for a next index is greater than a remaining number of PDCCH candidates or non-overlapped CCEs for the per TRP monitoring limit of the primary cell.

29. An apparatus for wireless communication, comprising:
    means for determining, by a UE, whether a per scheduled cell limit for physical downlink control channel (PDCCH) monitoring or for non-overlapped control channel elements (CCEs) to monitor in a slot is equal to a per transmit receive point (TRP) limit for PDCCH monitoring or for non-overlapped CCEs to monitor in the slot for a primary cell;
    means for identifying, based on the determining, a set of search spaces of a PDCCH on which overbooking is permitted;
    means for receiving the PDCCH from the primary cell within the slot; and
    means for performing blind decoding operations on CCEs within the identified set of search spaces of the PDCCH within at least a total monitoring limit for a group of component carriers having a same sub-carrier spacing (SCS) as the primary cell and the per cell monitoring limit for the primary cell.

30. A non-transitory computer-readable medium storing computer executable code, the code when executed by a processor causes the processor to:
    determine, by a UE, whether a per scheduled cell limit for physical downlink control channel (PDCCH) monitoring or for non-overlapped control channel elements (CCEs) to monitor in a slot is equal to a per transmit receive point (TRP) limit for PDCCH monitoring or for non-overlapped CCEs to monitor in the slot for a primary cell;
    identify, based on the determining, a set of search spaces of a PDCCH on which overbooking is permitted;
    receive the PDCCH from the primary cell within the slot; and
    perform blind decoding operations on CCEs within the identified set of search spaces of the PDCCH within at least a total monitoring limit for a group of component carriers having a same sub-carrier spacing (SCS) as the primary cell and the per cell monitoring limit for the primary cell.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    transmitting an indication of a value of a first multiplication factor indicating a capability to perform additional physical downlink control channel (PDCCH) monitoring or additional non-overlapped control channel element (CCE) monitoring for multiple transmit receive point (TRP) cells;
    setting a configured multiplication factor to a value of a received second multiplication factor or to the value of the first multiplication factor;
    determining whether a first minimum value is greater than a second minimum value, wherein the first minimum value is a minimum of: (i) a resulting factor value and (ii) a total monitoring limit value for a cell group with a sub-carrier spacing (SCS) of a primary cell, wherein the second minimum value is a minimum of: (i) a value for the SCS of the primary cell for a single TRP serving cell and (ii) the total monitoring limit value for the cell group with the SCS of the primary cell, and wherein the resulting factor value is the value of the configured multiplication factor multiplied by the value for the SCS of the primary cell for the single TRP serving cell, wherein each of the first minimum value and the second minimum value is a limit for the PDCCH monitoring or for the non-overlapped CCE monitoring for the primary cell in a slot;
    identifying, based on whether the first minimum value is greater than the second minimum value, search space sets of a PDCCH on which overbooking is permitted;
    receiving the PDCCH from the primary cell within the slot; and
    performing blind decoding operations on CCEs within the identified search space sets of the PDCCH, wherein the blind decoding operations are performed within at least the second minimum value.

2. The method of claim 1, wherein the determining whether the first minimum value is greater than the second minimum value comprises determining whether the total monitoring limit for the cell group with the SCS is less than or equal to the value for the SCS of the primary cell for the single TRP serving cell.

3. The method of claim 1, wherein the determining whether the first minimum value is greater than the second minimum value comprises determining whether the UE has signaled the value of the first multiplication factor to be 1.

4. The method of claim 1, wherein the determining whether the first minimum value is greater than the second minimum value comprises determining whether the UE has received a value of 1 for the received second multiplication factor.

5. The method of claim 1, wherein identifying, based on the determining, the search space sets on which overbooking is permitted comprises determining that the search space sets of the PDCCH includes all configured search spaces for the primary cell when the first minimum value is not greater than the second minimum value.

6. The method of claim 5, wherein performing blind decoding operations on CCEs within the identified search space sets of the PDCCH comprises:
 excluding monitored PDCCH candidates and CCEs corresponding to common search space sets from the second minimum value;
 decoding a UE specific search space starting at a lowest search space set index, and excluding a number of monitored PDCCH candidates and CCEs used for the decoding of each index from the second minimum value; and
 stopping the decoding when a number of configured monitored PDCCH candidates or CCEs for a next index is greater than a remaining number of PDCCH candidates or non-overlapped CCEs for the second minimum value.

7. The method of claim 1, wherein identifying, based on the determining, the search space sets of the PDCCH on which overbooking is permitted comprises determining that the search space sets of the PDCCH includes search space sets associated with one of the TRPs of the primary cell when the first minimum value is greater than the second minimum value.

8. The method of claim 7, wherein the search space sets associated with one of the TRPs of the primary cell are configured with control resource sets (CORESETs) that are associated with a corresponding configured value of a higher layer index per CORESET.

9. The method of claim 8, wherein the corresponding configured value of the higher layer index per CORESET is associated with a same one of the TRPs of the primary cell.

10. The method of claim 8, wherein the corresponding configured value of the higher layer index per CORESET is 0.

11. The method of claim 8, wherein the corresponding configured value of the higher layer index per CORESET is a higher layer index value per CORESET associated with a CORESET 0.

12. The method of claim 7, wherein performing blind decoding operations on CCEs within the identified search space sets of the PDCCH comprises:
 excluding monitored PDCCH candidates and CCEs corresponding to common search space sets from the second minimum value;
 decoding a UE specific search space within the search space sets associated with the one of the TRPs starting at a lowest search space set index, and excluding a number of monitored PDCCH candidates and CCEs used for the decoding of each search space set index from the second minimum value; and
 stopping the decoding when a number of configured monitored PDCCH candidates or CCEs for a next index is greater than a remaining number of PDCCH candidates or non-overlapped CCEs for the second minimum value of the primary cell.

13. A user equipment (UE), comprising:
 a transceiver;
 a memory storing computer-executable instructions; and
 a processor configured to execute the instructions and cause the UE to:
 transmit, via the transceiver, an indication of a value of a first multiplication factor indicating a capability to perform additional physical downlink control channel (PDCCH) monitoring or additional non-overlapped control channel element (CCE) monitoring for multiple transmit receive point (TRP) cells;
 set a configured multiplication factor to a value of a received second multiplication factor or to the value of the first multiplication factor;
 determine whether a first minimum value is greater than a second minimum value, wherein the first minimum value is a minimum of: (i) a resulting factor value and (ii) a total monitoring limit value for a cell group with a sub-carrier spacing (SCS) of a primary cell, wherein the second minimum value is a minimum of: (i) a value for the SCS of the primary cell for a single TRP serving cell and (ii) the total monitoring limit value for the cell group within the SCS of the primary cell, and wherein the resulting factor value is the value of the configured multiplication factor multiplied by the value for the SCS of the primary cell, wherein each of the first minimum value and the second minimum value is a limit for the PDCCH monitoring or for the non-overlapped CCE monitoring for the primary cell in a slot;
 identify, based on whether the first minimum value is greater than the second minimum value, search space sets of a PDCCH on which overbooking is permitted;
 receive, via the transceiver, the PDCCH from the primary cell within the slot; and
 perform blind decoding operations on CCEs within the identified search space sets of the PDCCH, wherein the blind decoding operations are performed within at least the second minimum value.

14. The UE of claim 13, wherein to determine whether a first minimum value is greater than a second minimum value, the processor is configured to determine that the total monitoring limit for the cell group with the SCS is less than or equal to the value for the SCS of the primary cell for the single TRP serving cell.

15. The UE of claim 13, wherein to determine whether a first minimum value is greater than a second minimum value, the processor is configured to determine whether the UE has signaled the value of the first multiplication factor capability to be 1.

16. The UE of claim 13, wherein to determine whether a first minimum value is greater than a second minimum value, the processor is configured to determine whether the UE has received a value of 1 for the received second multiplication factor.

17. The UE of claim 13, wherein the at least one processor is configured to determine that the search space sets of the PDCCH includes all configured search spaces for the primary cell when the first minimum value is not greater than the second minimum value.

18. The UE of claim 17, wherein the at least one processor is configured to perform the blind decoding operations on CCEs within the identified search space sets of the PDCCH by:
 excluding monitored PDCCH candidates and CCEs corresponding to common search space sets from the second minimum value;

decoding a UE specific search space starting at a lowest search space set index, and excluding a number of monitored PDCCH candidates and CCEs used for the decoding of each index from the second minimum value; and stopping the decoding when a number of configured monitored PDCCH candidates or CCEs for a next index is greater than a remaining number of PDCCH candidates or non-overlapped CCEs for the second minimum value.

19. The UE of claim 13, wherein the at least one processor is configured to determine that the search space sets of the PDCCH includes search space sets associated with one of the TRPs of the primary cell when the first minimum value is greater than the second minimum value.

20. The UE of claim 19, wherein the search space sets associated with one of the TRPs of the primary cell are configured with control resource sets (CORESETs) that are associated with a corresponding configured value of a higher layer index per CORESET.

21. The UE of claim 20, wherein the corresponding configured value of the higher layer index per CORESET is one of: associated with a same one of the TRPs of the primary cell, a value of 0, or a higher layer index value per CORESET associated with a CORESET 0.

22. The UE of claim 19, wherein the at least one processor is configured to perform blind decoding operations on CCEs within the identified search space sets of the PDCCH by:

excluding monitored PDCCH candidates and CCEs corresponding to common search space sets from the second minimum value;

decoding a UE specific search space within the search space sets associated with the one of the TRPs starting at a lowest search space set index, and excluding a number of monitored PDCCH candidates and CCEs used for the decoding of each search space set index from the second minimum value; and stopping the decoding when a number of configured monitored PDCCH candidates or CCEs for a next index is greater than a remaining number of PDCCH candidates or non-overlapped CCEs for the second minimum value.

23. An apparatus for wireless communication, comprising:

means for transmitting an indication of a value of a first multiplication factor indicating a capability to perform additional physical downlink control channel (PDCCH) monitoring or additional non-overlapped control channel element (CCE) monitoring for multiple transmit receive point (TRP) cells;

means for setting a configured multiplication factor to a value of a received second multiplication factor or to the value of the first multiplication factor;

means for determining whether a first minimum value is greater than a second minimum value, wherein the first minimum value is a minimum of: (i) a resulting factor value and (ii) a total monitoring limit value for a cell group with a sub-carrier spacing (SCS) of a primary cell, wherein the second minimum value is a minimum of: (i) a value for the SCS of the primary cell for a single TRP serving cell and (ii) the total monitoring limit value for the cell group within the SCS of the primary cell, and wherein the resulting factor value is the value of the configured multiplication factor multiplied by the value for the SCS of the primary cell, wherein each of the first minimum value and the second minimum value is a limit for PDCCH monitoring or for the non-overlapped CCE monitoring for the primary cell in a slot;

means for identifying, based on whether the first minimum value is greater than the second minimum value, search space sets of a PDCCH on which overbooking is permitted;

means for receiving the PDCCH from the primary cell within the slot; and means for performing blind decoding operations on CCEs within the identified search space sets of the PDCCH, wherein the blind decoding operations are performed within at least the second minimum value and the total monitoring limit for the cell group with the SCS of the primary cell.

24. A non-transitory computer-readable medium storing computer executable code, the code when executed by a processor of an user equipment (UE) causes the UE to:

transmit an indication of a value of a first multiplication factor indicating a capability to perform additional physical downlink control channel (PDCCH) monitoring or additional non-overlapped control channel element (CCE) monitoring for multiple transmit receive point (TRP) cells;

set a configured multiplication factor to a value of a received second multiplication factor or to the value of the first multiplication factor;

determine whether a first minimum value is greater than a second minimum value, wherein the first minimum value is a minimum of: (i) a resulting factor value and (ii) a total monitoring limit value for a cell group with a sub-carrier spacing (SCS) of a primary cell, wherein the second minimum value is a minimum of: (i) a value for the SCS of the primary cell for a single TRP serving cell and (ii) the total monitoring limit value for the cell group within the SCS of the primary cell, and wherein the resulting factor value is the value of the configured multiplication factor multiplied by the value for the SCS of the primary cell, wherein each of the first minimum value and the second minimum value is a limit for PDCCH monitoring or for the non-overlapped CCE monitoring for the primary cell in a slot;

identify, based on whether the first minimum value is greater than the second minimum value, search space sets of a PDCCH on which overbooking is permitted;

receive the PDCCH from the primary cell within the slot; and perform blind decoding operations on CCEs within the identified search space sets of the PDCCH, wherein the blind decoding operations are performed within at least the second minimum value.

* * * * *